(12) United States Patent
Gasparini et al.

(10) Patent No.: US 7,730,321 B2
(45) Date of Patent: *Jun. 1, 2010

(54) SYSTEM AND METHOD FOR AUTHENTICATION OF USERS AND COMMUNICATIONS RECEIVED FROM COMPUTER SYSTEMS

(75) Inventors: Louis A Gasparini, San Mateo, CA (US); William H Harris, Woodside, CA (US)

(73) Assignee: EMC Corporation, Hopkinton, MA (US)

( * ) Notice: Subject to any disclaimer, the term of this patent is extended or adjusted under 35 U.S.C. 154(b) by 1009 days.

This patent is subject to a terminal disclaimer.

(21) Appl. No.: 11/050,549

(22) Filed: Feb. 3, 2005

(65) Prior Publication Data

US 2005/0177750 A1    Aug. 11, 2005

Related U.S. Application Data

(63) Continuation-in-part of application No. 10/435,322, filed on May 9, 2003, now Pat. No. 7,100,049.

(60) Provisional application No. 60/542,101, filed on Feb. 4, 2004.

(51) Int. Cl.
*G06F 21/00* (2006.01)
(52) U.S. Cl. .................................. 713/182; 726/24
(58) Field of Classification Search .................. 709/225, 709/229; 713/170, 180, 182, 202, 200, 185, 713/273; 715/273; 726/5, 23, 24, 4; 705/39
See application file for complete search history.

(56) References Cited

U.S. PATENT DOCUMENTS 6,006,328 A * 12/1999 Drake ........................... 726/23

(Continued)

FOREIGN PATENT DOCUMENTS

EP        1046976        10/2000

(Continued)

OTHER PUBLICATIONS

Podio. F.L; Personal authentication through biometric technologies; Publication Date: 2002; Nat Inst. of Stand & Technol., Gaithersburg, MD; INSPEC Accession No. 7320960; pp. 57-66.*

(Continued)

*Primary Examiner*—Kambiz Zand
*Assistant Examiner*—Monjour Rahim
(74) *Attorney, Agent, or Firm*—Ryan, Mason & Lewis, LLP

(57) ABSTRACT

A system and method allows a user to authenticate a communication from a computer system, a computer system to authenticate a user, or both. When a user requests a web page from the web site, customization information that is recognizable to the user is provided to allow the user to authenticate the web site. A signed, encrypted persistent file stored on the user's computer system or installed on a different computer system, or a trusted computing subsystem allows the web site to authenticate the user. If the user is using a system that will not allow that user to be authenticated, the user may instruct the system to continue providing information without the user's customization information. The system and method may be used to allow the user to authenticate an e-mail message or its source, and Flash movies or other computer code may be used if the user's e-mail client does not employ cookies.

27 Claims, 15 Drawing Sheets

U.S. PATENT DOCUMENTS

| | | | |
|---|---|---|---|
| 6,067,561 A | 5/2000 | Dillon | |
| 6,161,139 A * | 12/2000 | Win et al. | 709/225 |
| 6,401,125 B1 * | 6/2002 | Makarios et al. | 709/229 |
| 6,460,141 B1 * | 10/2002 | Olden | 726/4 |
| 6,632,248 B1 * | 10/2003 | Isaac et al. | 715/273 |
| 7,111,037 B1 * | 9/2006 | Chesley et al. | 709/203 |
| 7,237,118 B2 * | 6/2007 | Himberger et al. | 713/182 |
| 7,257,836 B1 * | 8/2007 | Moore et al. | 726/5 |
| 7,509,679 B2 * | 3/2009 | Alagna et al. | 726/24 |
| 2002/0016922 A1 * | 2/2002 | Richards et al. | 713/200 |
| 2002/0066039 A1 * | 5/2002 | Dent | 713/202 |
| 2002/0124172 A1 | 9/2002 | Manahan | |
| 2002/0178360 A1 * | 11/2002 | Wenocur et al. | 713/170 |
| 2003/0046551 A1 * | 3/2003 | Brennan | 713/185 |
| 2003/0140230 A1 * | 7/2003 | de Jong et al. | 713/182 |
| 2004/0187023 A1 * | 9/2004 | Alagna et al. | 713/200 |
| 2005/0080723 A1 * | 4/2005 | Burchetta et al. | 705/39 |
| 2005/0166070 A1 * | 7/2005 | Zhuge et al. | 713/200 |

FOREIGN PATENT DOCUMENTS

| | | |
|---|---|---|
| EP | 04760929 | 4/2007 |
| EP | 05712935 | 2/2008 |
| WO | 0118636 | 3/2001 |
| WO | 0163878 | 8/2001 |
| WO | WO03048909 | 6/2003 |
| WO | PCT/US2005/013878 | 4/2005 |

OTHER PUBLICATIONS

Rachna Dhamija, J.D. Tygar, The Battle Against Phishing: Dynamic Security Skins, Symposium on Usable Privacy and Security (SOUPS), Jul. 6-8, 2005, Pittsburgh, PA, USA, 12 pages.

Written Opinion of the International Searching Authority, Dec. 18, 2006, 4 pages.

International Search Report, Dec. 18, 2006, 3 pages.

Australian Office Action, Nov. 13, 2006, 2 pages.

S. Loftesness, "Responding to "Phishing" Attacks-A Glenbrook Action Map," Glenbrook Partners LLC., Jan. 2004, pp. 1-12.

* cited by examiner

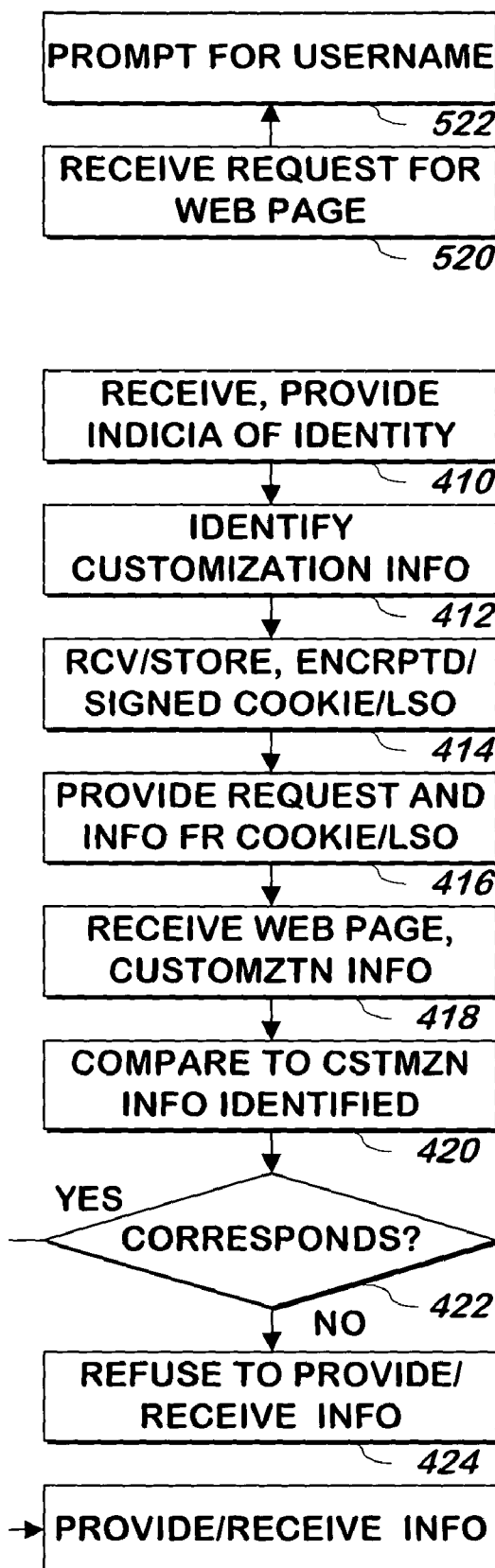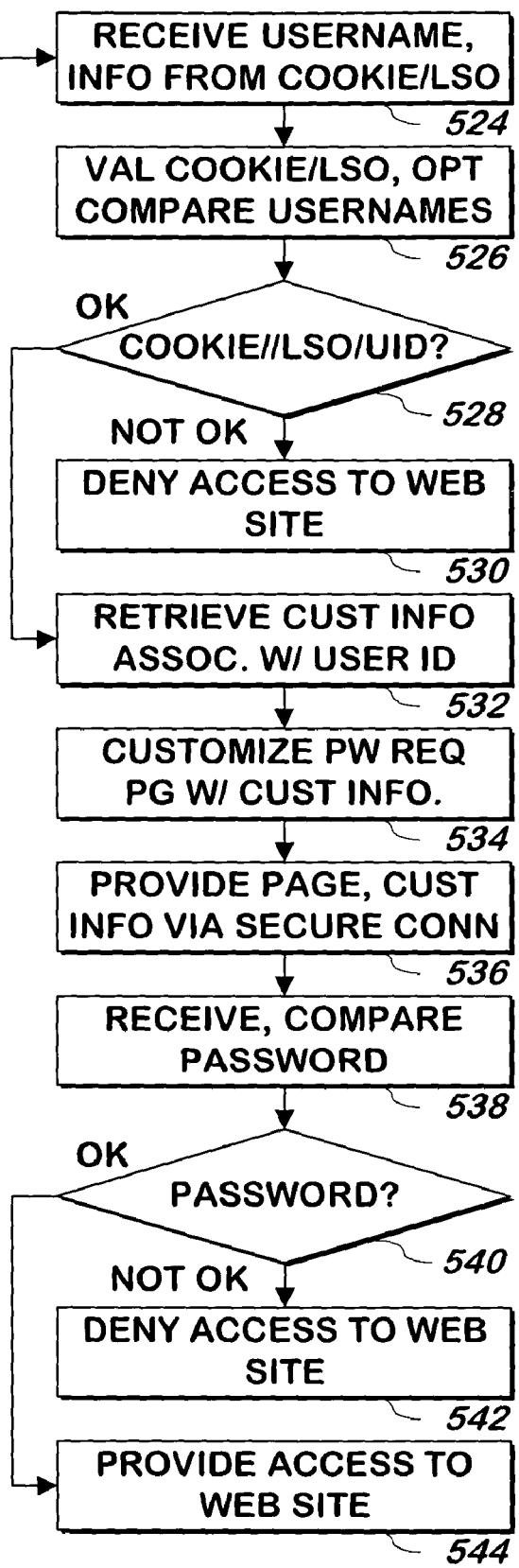
FIG. 4
FIG. 5B

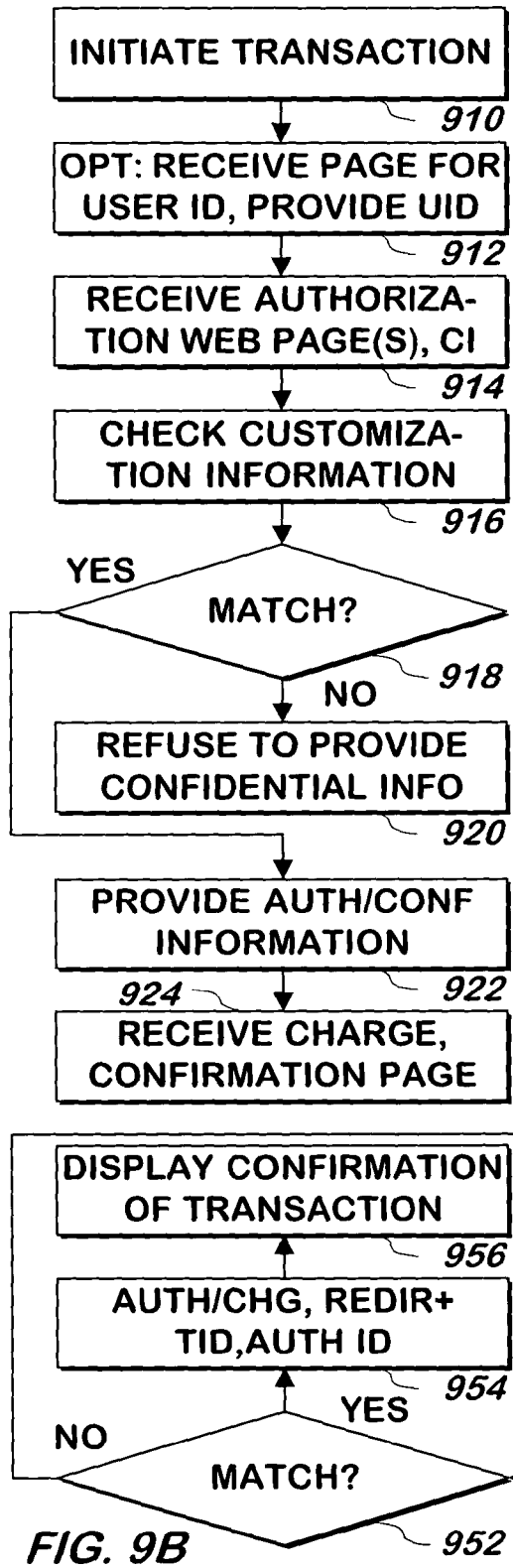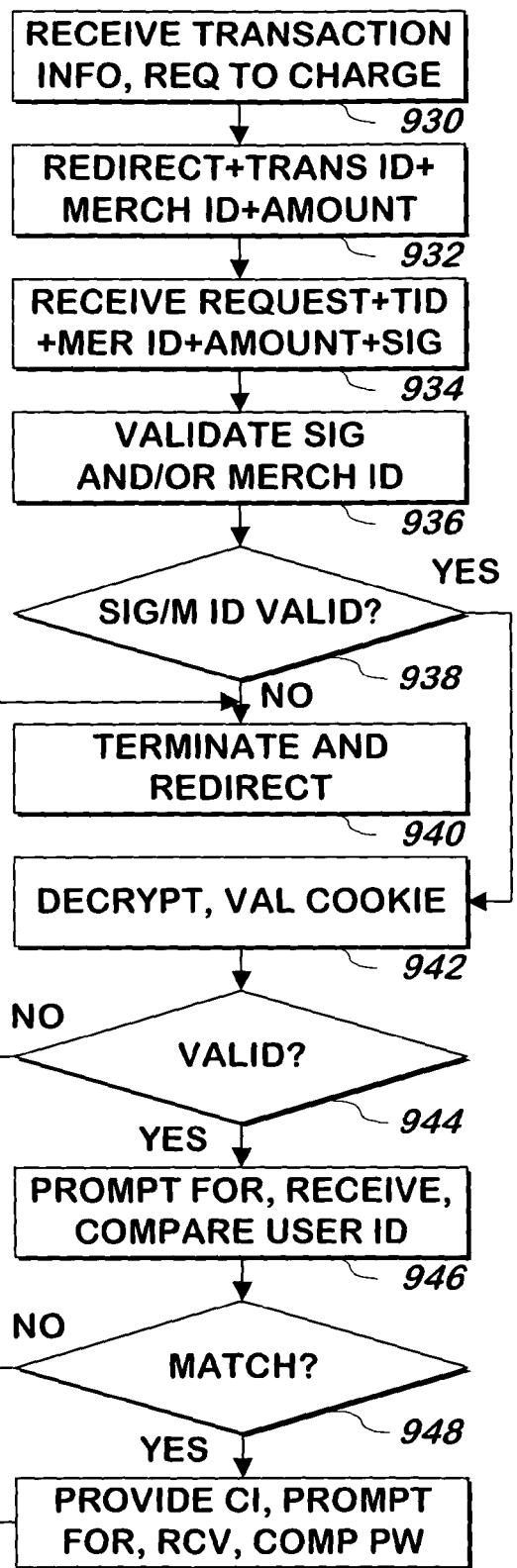
FIG. 9A
FIG. 9B

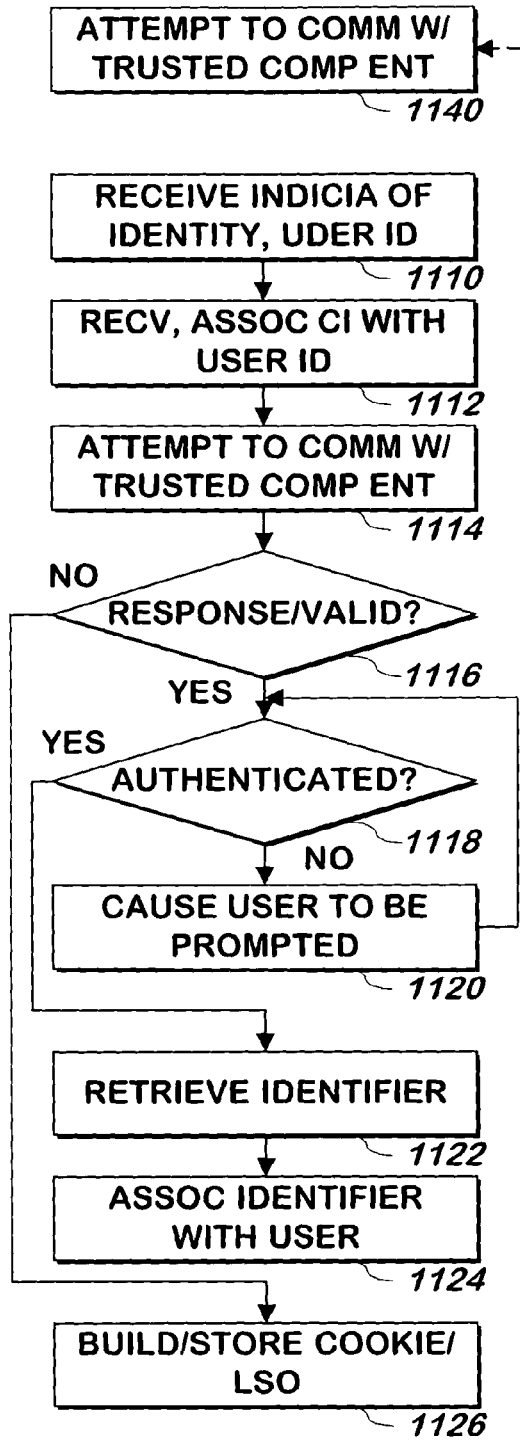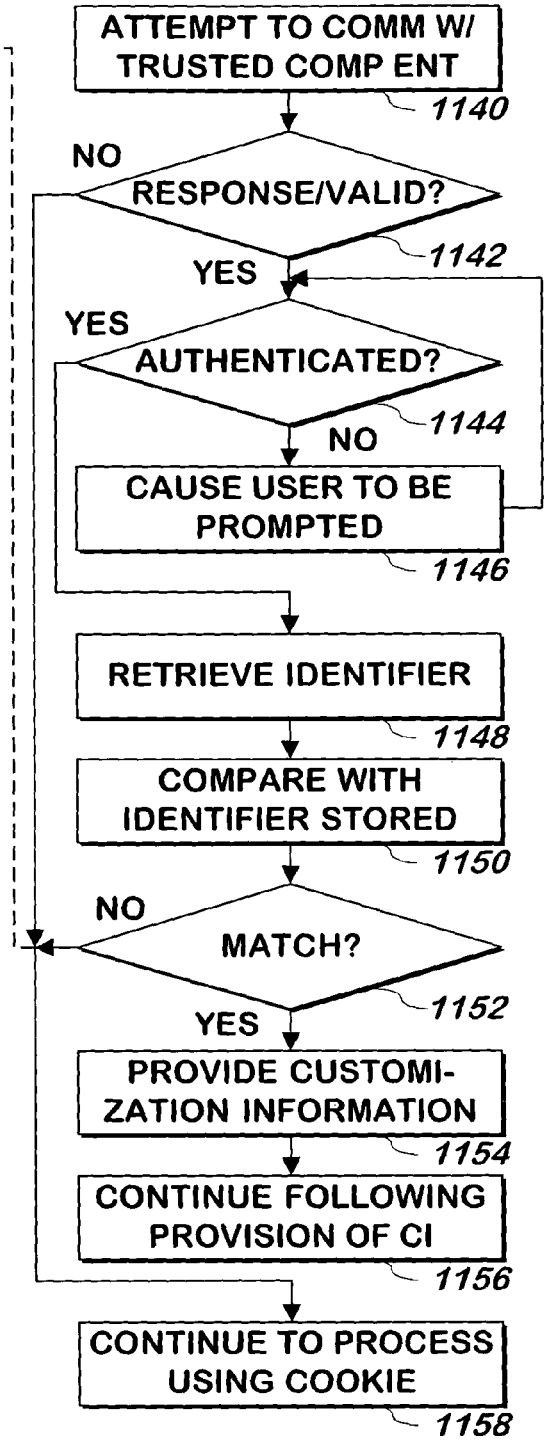
FIG. 11A
FIG. 11B

SYSTEM AND METHOD FOR AUTHENTICATION OF USERS AND COMMUNICATIONS RECEIVED FROM COMPUTER SYSTEMS

RELATED APPLICATION

This application claims the benefit of U.S. Provisional Application Ser. No. 60/542,101 entitled, "Method and Apparatus for Authentication of Users and Communications Received From Computer Systems" filed on Feb. 4, 2004 by Louis Gasparini and William Harris, and is a continuation in part of application Ser. No. 10/435,322, entitled, "METHOD AND APPARATUS FOR AUTHENTICATION OF USERS AND WEB SITES" filed on May 9, 2003 now U.S. Pat. No. 7,100,049 by Louis Gasparini and Charles Gotlieb and each is hereby incorporated by reference in its entirety.

FIELD OF THE INVENTION

The present invention is related to computer security and more specifically to computer security for the Internet.

BACKGROUND OF THE INVENTION

The Internet and the World Wide Web allow users to communicate with software operating at various sites on the Web. The communication may be performed in real time, or via a messaging system such as e-mail. However, it may be helpful to allow one or both of these entities to ensure that the other entity with whom the entity is communicating really is that other entity.

If the web site believes it is communicating with one entity, but it is in fact communicating with a different entity, it may provide access to sensitive information of the entity with which it falsely believes it is communicating. It may cause the transfer of securities, the shipment of products or the delivery of services to the different entity in the name of the entity with which it believes it is communicating. For example, some operators of web sites lose significant amounts of money by shipping products or transferring cash or other securities to thieves who falsely identify themselves to the web site as a registered user.

Many of these thieves trick the users into providing confidential information that the thief can use to identify herself as a registered user, by appearing to the user as if a web site operated by the thief is in fact a web site with which the user has registered or by sending the user an e-mail message containing information or a link that can cause the user to provide confidential information to the thief, or both. For example, a thief may send out a batch of e-mails inviting the user to log on to paypal.com with a link to the web site paypai.com, hoping that the recipient of the e-mail is registered at the financial web site paypal.com. However, the thief capitalizes the last letter in her site to read paypaI.com, hoping the 'I' looks like the lower case last letter 'l' in "paypal". The web pages provided by the web site paypai.com are then made to look like the web site paypal.com, and when the user attempts to log in, the user's username and password are captured by the thief's web site. The thief then logs into paypal.com using the user's username and password thus received and authorizes the transfer of money from the user's account into an account controlled by the thief.

In another variation of the scam, the thief provides to the user a link containing what appears to be a URL of the actual site, but in fact is a command to log into the thief's site. For example, a link that reads "http://" appended to "www.paypal.com/%sdafghdgk%fdsgsdhdsh . . . " may appear to be a genuine link to paypal.com, with a long list of parameters that extend off the end of the URL window in the user's browser. Unknown to the user, the above link actually terminates with " . . . @paypai.com", which causes the user to be logged into the web site paypai.com using as a username, the set of characters to the left of the "@" sign. The web site paypai.com allows any such username to log into the web site, and then operates as described above, presenting a replica of the paypal.com user interface to the user that allows the user to log on to the application software at the thief's web site (even though the phony username has been provided via the link). The thief then uses the username and password thus received to log onto the real paypal.com web site and make the transfer.

To combat this problem, some web sites provide a certificate to allow the user to verify that the web site is authentic, but the procedures for performing such authentication are complex, cumbersome and unknown to most users. Thus, conventional methods that could be used to allow a user to authenticate the web site are ineffective because they are too difficult to use.

Not only can a dishonest operator of a web site mislead a user into believing that a web site is authentic, a dishonest user can mislead an authentic web site into believing that the user is authentic. As described above, confidential information from a user can be captured and then used to cause the web site to believe it is dealing with that user. Some web sites place cookies on the user's computer and these cookies could be used to attempt to verify the possibility that the person attempting to log in is in fact that person. However, a cookie can be faked by a thief to indicate that the thief's computer system is the computer system of a user the thief is attempting to impersonate.

The related application described an arrangement by which a signed, encrypted cookie was placed on the user's computer system during a registration process that could be used by software to authenticate a user, and recognizable customization information was provided or indicated by the user to software that could be provided to the user to allow the user to authenticate a communication from a computer system. This approach works well, but has certain limitations, all of which are being addressed in this application.

One such limitation is the lack of a verifiable ability of the user to authenticate himself during the registration process. The related application employed the provision of an out-of-session identifier that the user received through means other than the communications session the user was using to register himself. However, the method may not be secure if the out-of-session method (e.g. a telephone call via a telephone number or an e-mail address) was not known to belong to the user or was not secure. Another limitation is that, once registered, the user can only authenticate himself from then on using the client computer system on which the cookie has been stored. Another limitation is the potential for multiple users of the computer system to view one another's customization information or for an unauthorized user of the computer system to view a user's customization information.

It can also be desirable to allow a user to authenticate an e-mail message or other communication without a significant chance that the confidentiality of the user's customization information will be compromised. As described herein, cookies and other persistent files can solve this problem. However, some e-mail clients do not support the use of cookies. Furthermore, it can be desirable to allow a user to authenticate an e-mail message without being connected to a network.

What is needed is a system and method that can securely authenticate a user to a computer system, easily allow the user to authenticate communications from a computer system without requiring the user to use complex authentication procedures, or both, can authenticate a user even during the registration process, can allow a user to authenticate himself or herself to a computer system from various client computer systems or bypass the need for strict authentication, can protect the user's means of authenticating the computer system from others who have access to the user's client computer system, and can allow a user to authenticate e-mail messages or other communications without significant chance that the user's capability to authenticate the computer system will be compromised.

SUMMARY OF INVENTION

A system and method provides an encrypted, signed cookie or other persistent file such as a Flash local shared object on a user's computer system to allow a computer system to identify and authenticate the user. In addition, or alternatively, customization information is associated with an identifier of the user to allow the user to recognize that communications received from the same or a different computer system are authentic. When the user requests a web page or other communication from a computer system, the persistent file is retrieved by the web site or computer system and the signature and user identifier contained in the persistent file or computer code may be checked to authenticate the user. An identifier in the persistent file may be used to identify the user and allow the computer system to provide the customization information the user can recognize to authenticate the web site or other communications from the computer system. The user can then trust communications that provide the customization information the user is expecting. If the customization information is missing or different, the user can refuse to provide confidential information to that computer system, or refuse to believe information provided by the computer system, thus protecting his or her username and password and other confidential information from a thief.

The system and method can authenticate the user before providing the persistent file by requesting information few people other than the user would know, and then verifying that information, for example using a third party. The customization information may be supplied only after the user has supplied a valid username in order to secure the customization information from others who may have access to the user's computer system. The persistent file may contain the user's static IP address, the MAC address of communication interface or another identifier of client computer system 260, and/or a digital certificate, which may be checked when the persistent file is used for additional security. The user may indicate that he or she wishes to have the persistent file installed on a different computer system, or that the computer system can suspend authenticating the user or providing the customization information when the user is using a computer system that does not contain the persistent file. A trusted computing subsystem, such as a biometric identification system or physical key may be used in place of the persistent file to allow users to use other computer systems that may not employ the cookie or provide additional security when authenticating a user.

The customization information may be provided in an e-mail message to allow the user to authenticate the message or its sender. A Flash movie or other code may allow the computer system providing the customization information in an e-mail or other communication to authenticate the user, even if the user's e-mail client or browser does not support the use of cookies. The customization information may be encrypted into the Flash movie itself or another file sent with the e-mail, so that the user can authenticate the e-mail message or other communication even when that user is not connected to a network.

The system and method can be used to authenticate a user and to allow the user to authenticate a computer system for the purpose of authorizing a payment, for example, using a financial instrument such as a credit card.

BRIEF DESCRIPTION OF THE DRAWINGS

FIG. 4 is a flowchart illustrating a method of authenticating by a user a communication from a computer system according to one embodiment of the present invention.

FIG. 5B is a flowchart illustrating a method of a method of authenticating a user to a computer system and authenticating a communication to the user from the same or a different computer system according to one embodiment of the present invention.

FIG. 9A is a flowchart illustrating a method of paying for a transaction over the Internet according to one embodiment of the present invention.

FIG. 9B is a flowchart illustrating a method of receiving authorization to charge a financial instrument of a user according to one embodiment of the present invention.

FIG. 11A is a flowchart illustrating a method of registering a user according to one embodiment of the present invention.

FIG. 11B is a flowchart illustrating a method of authenticating a user according to one embodiment of the present invention.

DETAILED DESCRIPTION OF A PREFERRED EMBODIMENT

Figure 1:
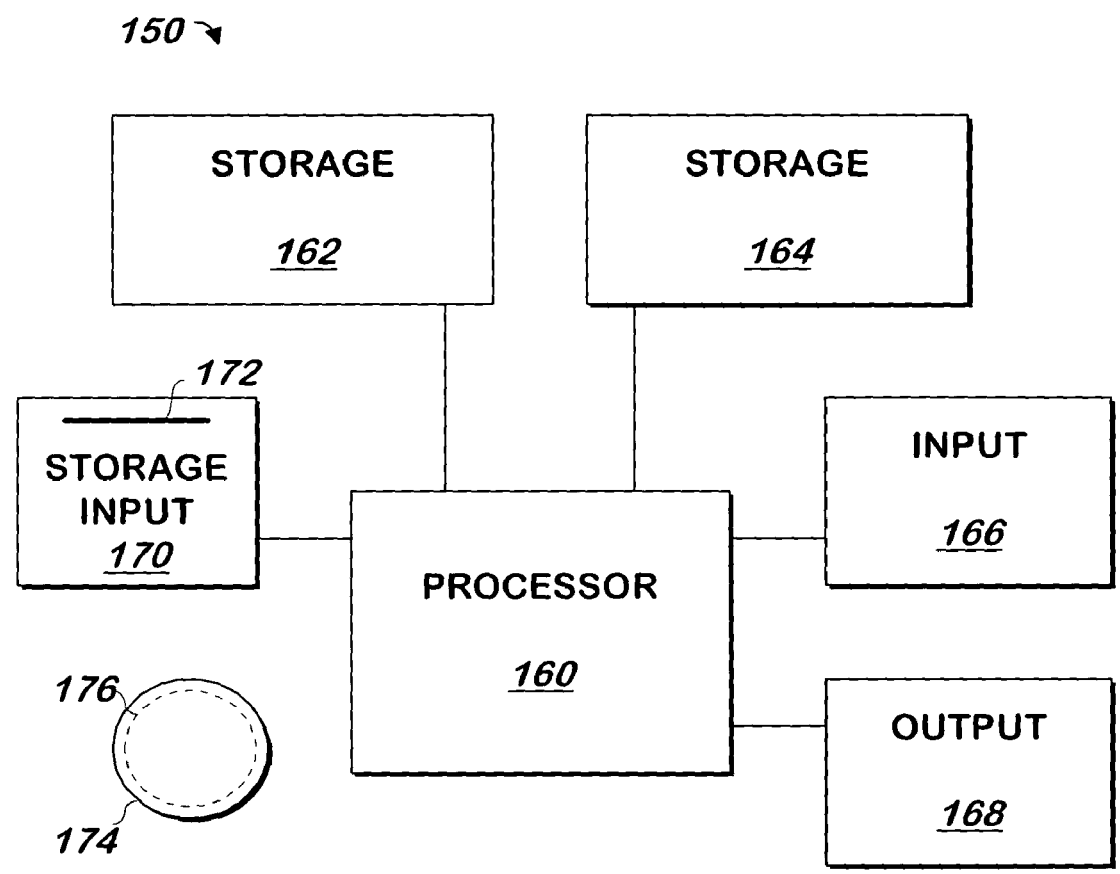
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used.

Figure 2A:
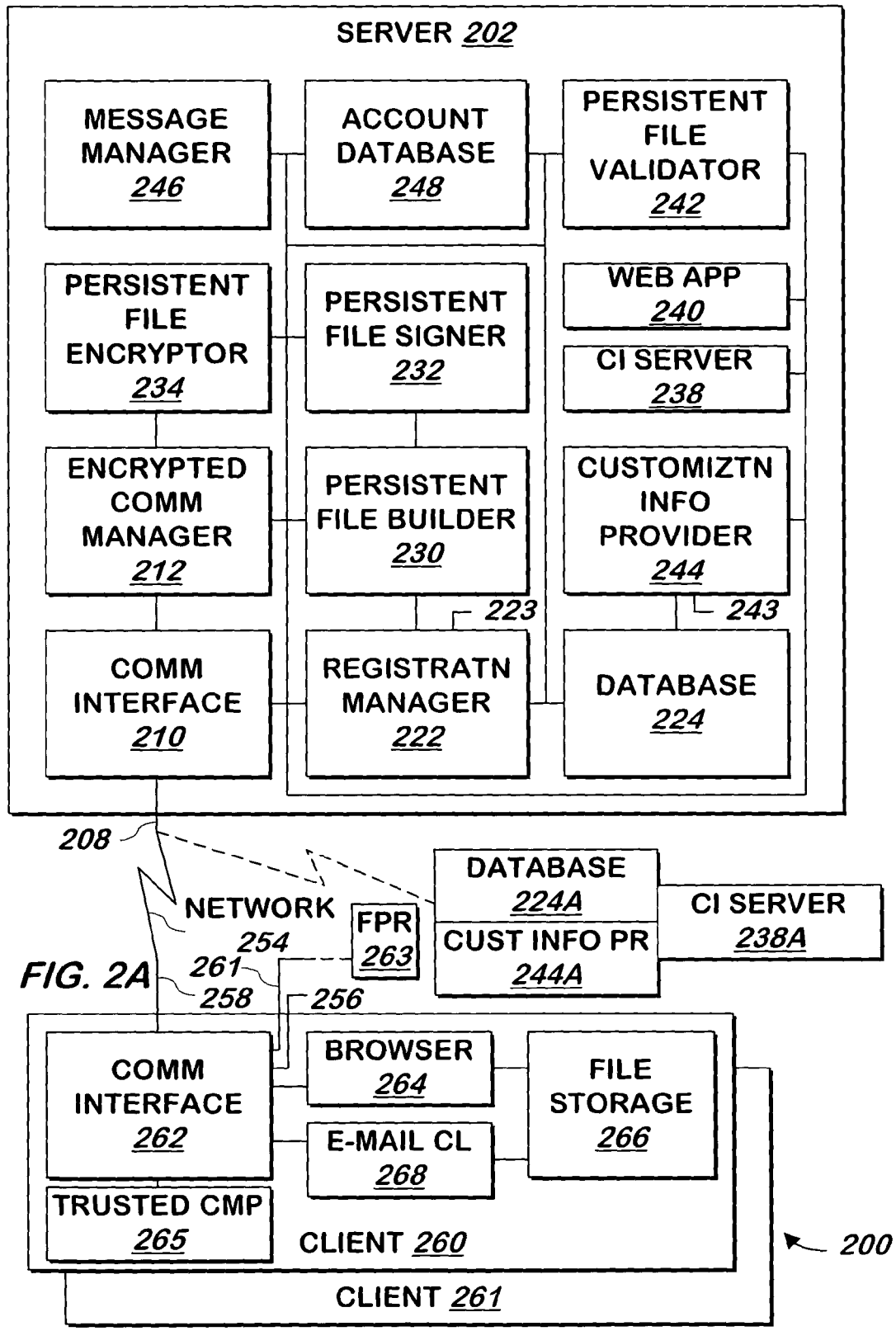
FIG. 2A is a block schematic diagram of a system for allowing a user to authenticate one or more communications from a computer system, and the same or a different computer system to authenticate the user according to one embodiment of the present invention.

Referring now to FIG. 2A, a system 200 for allowing a user to authenticate one or more communications from a computer system, and a computer system to authenticate the user is shown according to one embodiment of the present invention. Although both of these functions are described herein, in one embodiment, one of these functions may be used without the other: it is not necessary to employ both functions according to the present invention, although other embodiments employ both functions.

System 200 includes one or more servers and one or more clients, a representative server 202 and client 260 being shown, although multiple clients may access server 202 simultaneously or at different times and multiple servers may be simultaneously used. Server 202 is shown with a superset of components, and there may be multiple servers, each with the superset of components shown or a subset of them.

In one embodiment, all communication into or out of server 202 described herein is made via input/output 208 of communication interface 210 which is coupled to a network 254 such as the Internet or a local area network or both. Communication interface 210 is a conventional communication interface that supports Ethernet, TCP/IP or other conventional communication protocols.

Communication into and out of client 260 is made via input/output 258 of communication interface 262, which includes a conventional communication interface similar or identical to communication interface 210, but may also contain conventional circuitry to couple to a conventional keyboard/monitor/mouse (not shown), or other similar conventional input/output device, via input/output 256. Client computer system 260 may be coupled to network 254 via a modem coupled to input/output 258 that is also part of communication interface 262.

Registration

In one embodiment, a registration process is performed to identify customization information for each of many users to allow the user to perceptively authenticate communications from one or more computer systems as described in more detail below. Such perceptive authentication may include anything capable of detection by the user, such as the look of one or more web pages, one or more sounds provided incident thereto, smell, touch, or taste. For example, a photo of the user may appear on an initial web site log on page, and optionally on subsequent pages, or in an e-mail message to indicate to the user that the communication is authentic. A certain text phrase may be used in place of, or in addition to the photo. A sound known to the user may be used in addition to, or in place of, any of these.

The registration process associates an identifier of the user with the customization information that will be provided to the user to allow the user to authenticate communications from a computer system, such as one or more pages of a web site, an e-mail or other communications, as will now be described. In one embodiment, the user provides or selects the customization information, although in another embodiment a system administrator performs this function and then informs the user of the customization information.

In one embodiment, the user uses a conventional browser 264, communication interface 262 and network 254 to log into the server 202 via a request for a web page received via communication interface 210, which, based on the port number of the request, is provided to web application 240. Although browser 264 is used as described herein, other embodiments may employ operating system software, a servlet, or other application software.

Web application 240 redirects the user's browser to a secure sockets layer port on server 202 (or a different server similar or identical to server 202 described herein), and the user's browser 264 resends the request via a secure sockets layer connection, which communication interface 210 provides to encrypted communication manager 212. Encrypted communication manager 212 uses conventional SSL processing techniques to establish the connection, receive the request and decrypt the request, and provides the decrypted request to web application 240.

Web application 240 attempts to read a persistent file (e.g. a cookie, Flash local shared object or other similar file) that may have been stored in file storage 266 and, if so stored, was provided to the server 202 by browser 264 as part of the connection. In one embodiment, if the persistent file does not exist (or in another embodiment, in all cases), web application 240 builds a web page (which may also allow the user to log in as described below) that includes a link to a registration page provided by registration manager 222. If the user clicks the link, the user's browser 264 will request the registration page, which may use the SSL connection described above or a different SSL connection. Communication interface 210 will receive the request and provide it to registration manager 222 via an SSL connection via encrypted communication manager 212 and registration manager 222 provides the page via communication interface 210 and encrypted communication manager 212 which uses the SSL connection.

The user may provide sufficient indicia of the user's identity to indicate that the user is who the user says he is. This process is enforced by registration manager 222 although it may be performed in a wide variety of ways.

In one embodiment, the web page provided by registration manager 222 requires for registration the user identifier and/or password of a person who has verified the identity of the party, which registration manager 222 has previously stored in database 224 so that the provided user identifier and/or password may be compared by registration manager 222 with a set of authorized user identifiers and passwords to determine whether the user had provided sufficient indicia of his identity. In another embodiment, registration manager 222 prompts the user for another set of one or more identifiers that have been provided to the user through out-of-session means, such as mail, fax or telephone, or via another web connection or an e-mail message and that were previously generated and provided to the user by registration manager 222.

In one embodiment, the web page provided by registration manager 222 prompts the user to select or enter, not only his or her user identifier and optionally a password, but also to enter information that can be verified by a third party, such as the user's name and any or all of 1) a social security number; 2) credit information (e.g. the last few digits of a credit card or other account at a financial institution, or the dollar amount or merchant involved in a recent transaction amount made to such an account), 3) drivers license information or 4) other information that may be verified by a third party and registration manager 222 receives such information via conventional techniques such as CGI. Registration manager 222 communicates with computer or other systems of such third party via communication interface 210 and network 254 to verify some or all of the information provided. If the third party verifies the information provided to it, registration manager 222 considers the user to have provided sufficient indicia of his or her identity, and so registration manager 222 allows the user to continue to register as described herein, and otherwise, registration manager 222 does not allow the user to continue to register.

Depending on the security needs of the web site, the user may provide such sufficient indicia of identity without such other system-provided information. This may be a user identifier and password, but may also be a mother's maiden name, or other information that had been previously collected from the user or another source and stored in database 224. A challenge and response arrangement may be used in which one or more questions are randomly selected and provided to the user by registration manager 222 and registration manager receives the responses and compares the responses to the questions (e.g. pets name) to a record in database 224 that correspond with a user identifier (and optionally a password) that is also provided by the user to registration manager 222 via the same web page form or a different web page form that is provided by registration manager. In another embodiment, the user identifier or user identifier and password provided by the user to registration manager 222 via a web page form it generates in response to the request may be sufficient indicia of the user's identity.

In still another embodiment, the user need not authenticate himself to registration manager 222 and in such embodiment, sufficient indicia of the user's identity is the fact that the party is connected to the web site at a certain time, from a specific IP or MAC address or otherwise, as detected by registration manager 222 using conventional techniques or such information is used in addition to other information to supply sufficient indicia of the user's identity.

At this point, the user may be considered to have provided sufficient indicia of the user's identity. However, to complete the process of the user supplying sufficient indicia of his or her identity, in one embodiment, it may be desirable for registration manager 222 to supply a password via an out-of-session means, for example, via a telephone connection or e-mail. The user can then enter this password to complete the process of supplying sufficient indicia of the user's identity. An out-of-session means is any communication means other than the one the user is using to communicate with registration manager 222.

In one embodiment, registration manager 222 registration manager 222 retrieves, from account database 248 in a record corresponding to the user's identifier, an identifier of an out-of-session means of communication (e.g. a telephone number or an e-mail address) that may be used to supply a one time use password to allow the user to further authenticate himself. In another embodiment, registration manager 222 provides, on the same or a different web page described above, a prompt for an identifier of an out-of-session means of communication, and registration manager 222 receives such identifier. Account database 248 is a conventional database holding account information for each of several users.

Registration manager 222 then generates a password, which it provides in an out-of-session manner corresponding to the identifier, either via communication interface 210 or via input/output 223, which can be used to communicate in the out-of-session method, registration manager 222 containing a suitable interface.

For example, the out-of-session method may be a telephone, with the identifier being a telephone number, the suitable interface in registration manager 222 being a conventional telephony interface and a conventional text-to-speech converter or conventional voice response system.

Registration manager 222 then prompts the user via a web page to enter the password it provided in the out-of-session manner as described above and when the user complies, registration manager 222 receives the password from the user and compares it to the password it provided using the out-of-session means described above. If the two passwords match, registration manager 222 considers the user to have provided a sufficient indicia of the user's identity. If the two passwords do not match, or the user does not provide the password in a sufficient period of time after it has been provided as described above, registration manager 222 does not consider the user to have provided a sufficient indicia of the user's identity and will not allow the user to register customization information as described below. In one embodiment, the password provided in this manner is a one time use password, which registration manager 222 immediately requires the user to change after it has been entered as described above, and stores the changed password in the user's record in account database 248.

As an example of the above approach, registration manager 222 may prompt the user via encrypted communication manager 212 to provide his or her drivers license number, along with the user's user identifier and an e-mail address. Registration manager 222 receives the user identifier and drivers license number via conventional techniques such as CGI, and retrieves the name and address stored for that user identifier in account database 248, which may be a conventional database, such name and address being stored previously by a system administrator. Registration manager 222 then provides the name, address and drivers license number to the licensing authority in the state of the user's residence and receives an indication from the state licensing authority that the drivers license number matches the name and address. As a result, registration manager 222 mails a password to the user via the user-supplied e-mail address as a one-time use password and allows the user to continue the registration process as described herein. The user will log in using the password to complete the process of providing a sufficient indicia of the user's identity, and registration manager 222 will then prompt the user to change the password via encrypted communication manager 212, and will store the new password into account database 248 in the record corresponding to the user identifier.

As noted above, once it receives sufficient indicia of identification from the user, registration manager 222 builds a new record in database 224 and stores the user identifier received as described above in a record for the user in database 224 if the identifier is not already stored in any such record that may already exist for that user.

The User Provides Customization Information.

After the user has provided sufficient indicia of the user's identity, registration manager 222 prompts the user to select from a predefined list of, or provide, customization information, some or all of which can be presented to the user when the user is requested to provide confidential or other information to a web site or when the user may wish to authenticate a communication, such as an email message, or its source. As noted above, a system administrator can select or provide the customization information for a user in another embodiment.

Customization information may be anything that the user can use to recognize that the web site is authentic. It may be any number of any of the following: a photo, a graphic, a color, a layout, a message, a sound, a smell, or anything that may be sensed by touch. The customization information may be selected from a list or may be original information that is provided by the user who will use it to identify the authenticity of the web site, such as a digital photo of himself. The customization information need not be static: it may be a formula, such as "Today is @date", where "@date" is replaced by that day's date, or "Only (@5May-today) days until your birthday" in which the number of days until the following fifth of May is substituted for "(@5May-Today)" as that user's customization information when such information is provided as described herein.

Registration manager 222 provides a web page to allow the user to select or provide any number of any of the above items or other similar information and then stores the items or indications of the items in the database record for the user in database 224 which may be a conventional database, and may be the same as account database 248. In still another embodiment, registration manager 222 generates or selects (i.e. randomly) such customization information and provides it to the user and stores it in the database record in database 224. The customization information may be provided by registration manager 222 via the web page or out-of-session as described above.

In one embodiment, registration manager 222 provides, or prompts and receives the customization information via encrypted communication manager 212 which initiates and uses a secure communication channel such as SSL-encrypted communications, to provide, or prompt and receive the customization information to prevent others from intercepting the customization information.

A Cookie is Encrypted, Signed and Stored.

Registration manager 222 also initiates the storage of a signed, encrypted persistent file on the user's computer system. Such storage may be performed at any time after the user has provided the sufficient indicia of the user's identity as described above, and may be performed either before, after or in place of, the identification of customization information described above.

To build and store the persistent file, registration manager 222 provides to persistent file builder 230 the identifier of the user stored in the user's record in database 224 as described above. Persistent file builder 230 includes the user identifier into the persistent file and may add other status information to the persistent file, such as the IP address or MAC address of communication interface 262, which persistent file builder 230 receives from registration manager 222, or a digital certificate, each described in more detail below, and provides the identifier and the other information to persistent file signer 232, which signs the persistent file using conventional cryptographic techniques, such as by hashing the identifier, and optionally the other information, using a secret hash key to produce a hash result referred to herein as the persistent file signature. Persistent file signer 232 provides the persistent file signature, identifier and optionally, the other information, collectively referred to as the persistent file, to persistent file encryptor 234, which encrypts the persistent file using conventional encryption techniques, such as using the public key of a public key/private key pair or using a symmetric key. Persistent file encryptor 234 then causes browser 264 to store the encrypted persistent file in file storage 266 on the user's client computer system 260 via encrypted communication manager 212, communication interface 210, network 254 and communication interface 262, optionally using an SSL connection, such as the connection used for registration as described above. File storage 266 may be conventional memory or disk storage and may be a portion thereof used for the storage of persistent files, and may be part of the client computer system 260 or may reside in a removable device such as a smart card, USB memory token (a portable memory device that interfaces to a personal computer through a USB port, such as the USB Memory Key commercially available from Dell Computer Systems of Round Rock, Tex.) or the like.

Although a cookie may be used as a persistent file as described herein, other embodiments may employ other types of encrypted files, certificates or other similar data structures. For example, as described in more detail below, a Flash local shared object may be used as a persistent file, for example, by registration manager 222 supplying a Flash movie in the form of a ".swf" file, for example, as part of a web page it supplies. The Flash movie receives information from persistent file encryptor 234 in a form similar or identical to the persistent file described herein, and may store this information as a Flash local shared object into file storage 266. Flash and local shared objects are described at the web site, Macromedia.com.

In one embodiment, the user's client computer system 260 need not be used for the initial registration. Instead, the registration process may be performed in two parts: the first part allows the user to select customization information as described above from a specific set of browsers with known IP addresses or authenticated using a system administrator user, identifier and password. The second part allows the user to log in using the indicia of the user's identity as described above from his own browser, at which time the encrypted persistent file is placed on the user's client computer system 260. As described in more detail below, the user may employ other computer systems to authenticate himself or herself to a computer system as described herein.

Authenticating a Communication from a Computer System and/or the Identity of the User.

A user may use the present invention to authenticate a communication from a computer system, for example, authenticating a web page provided by server 202, and the same or a different computer system, such as server 202 may use the present invention to authenticate the user as described herein. For example, subsequent to receiving the persistent file as described above, when the user requests a web page from a web site, the user will use his or her web browser 264 (which, as used herein, may be a conventional web browser or another application program) to send the request to server 202. The request may be received due to a user entering a URL into a web browser, clicking a link on a web page, e-mail or alert, or due to a redirect command from another web site. Browser 264 sends the request to server 202 via communication interfaces 262 and 210 and network 254. Communication interface 210 passes the request to web application 240, which is a conventional web application program, modified to operate as described herein. Web application 240 may authenticate the user, provide customization information to allow the user to authenticate the web site, or both, as will now be described.

To authenticate the user, web application 240 reads the encrypted persistent file provided by browser 264 from file storage 266, such persistent file being placed in file storage 266 as described herein. Web application 240 passes the encrypted persistent file to persistent file validator 242, which decrypts the encrypted persistent file, and then separates the signature from the remainder of the persistent file. Persistent file validator 242 verifies that the signature corresponds to the remainder of the persistent file (e.g. by rehashing the remainder of the persistent file using the same hash algorithm and hash key as was used to build the signature, and comparing the hash result to the signature) and either provides web application 240 with the user's identifier and other information that may be stored in the persistent file if persistent file validator 242 authenticates the user via the signature (e.g. the hash result it generates matches the signature), or indicates that the persistent file is not valid (e.g. if the hash result persistent file validator 242 generates does not match the signature).

In one embodiment, during the registration process described above, registration manager 222 prompts the user to identify whether the user's computer system accesses the internet via a method associated with a static IP address, for example, via DSL or a cable modem. If the user so indicates, registration manager 222 provides the IP address (or unconditionally provides the MAC address) of communication interface 262 to persistent file builder 230, which includes in the signed, encrypted persistent file the user's IP address (or MAC address) or an indication that the IP address is not static. In this embodiment, web application 240 also provides to persistent file validator 242 the source IP address contained in the request. If the persistent file indicates that the persistent file contains a static IP address, if the source IP address of the user's request received (or MAC address) does not match the IP address (or MAC address) in the persistent file, persistent file validator 242 indicates the persistent file is not valid, even if the user identifiers and signature matches as described above.

In one embodiment, persistent file validator 242 also requires that the persistent file have a valid digital certificate, which persistent file validator 242 validates using conventional techniques. If the digital certificate is not valid, persistent file validator 242 indicates the persistent file is not valid, even if the other validity tests pass as described above. The digital certificate may be provided to persistent file builder 230 by registration manager 222 during the registration process described above, for inclusion into the signed, encrypted persistent file.

If persistent file validator 242 indicates the persistent file is not valid, web application 240 may deny access to some or all of the web site. Otherwise, web application 240 receives the user identifier and uses the user identifier to operate web application 240 and/or provide customization information, selected as described herein, to the user.

In one embodiment, web application compares 240 compares the user identifier received from the user with one received from persistent file validator 242. If the user identifiers match, web application 240 provides the requested web page with the customization information as described herein. If the user identifiers do not match, web application 240 denies access to the requested web page and customization information. In one embodiment, the user will also use browser 264 to enter a password, either at the same time as the user enters the user identifier as described above, or at a later time as described in more detail below. In one embodiment, web application 240 also compares the password to a password for that user identifier stored in account storage 248, and denies access to the requested web page and the customization information if the password received from the user does not match that stored for the user identifier.

Customization information may be provided with every web page provided by web application 240, some web pages, with web pages that are displayed to provide confidential information to the user, with web pages used to request any information from the user, or with web pages that are used to request confidential information from the user or any combination of some or all of these. Confidential information may include information that can be used to gain access to financial or other resources of the operator of the web site or the user (e.g. the password described above), or other information that a user may not wish others to know.

Customization information may be provided as part of web pages described above, or it may be provided separately. To provide customization information with any of the web pages described above, web application 240 provides to customization information provider 244 the user identifier received as described above and the contents of a web page that has the customization information omitted, optionally with one or more indications in the web page that describe how and where to insert the customization information into the web page, along with the user's IP address and other information that can be used to address the web page.

In one embodiment, customization information provider 244 retrieves from database 224 the customization information stored in the record corresponding to the user identifier, and provides the customization information, for example by adding it to the web page it receives from web application 240 in accordance with instructions received with, or as part of the web page or by providing it at a certain place in the web page or at multiple places, such as at or near the four corners of the web page, and provides to the user the customization information with any web page it receives using the user's IP address it receives. The customization information may be incorporated into the web page, or provided by customization information provider 244 via a one or more tags or links or contained in computer code, such as a Flash movie or Javascript applet. The tags or links identify the customization information to be provided, and may identify a server, such as server 202, which can provide the customization information in response to a request made by browser 264 attempting to display the information corresponding to the one or more tags or links, as described in more detail below. In one embodiment, customization information provider 244 generates, and then associates, with the customization information for the user in database 224, an identifier contained in part of the one or more tags or links, which, as described in more detail below, customization information server 238 uses to fulfill any requests for the customization information. The tags, links or computer code provided by customization information provider 244 are built to contain this same code. The customization information or pages with references thereto may be provided via a secure connection provided by encrypted communication manager 212 or out-of-session as described below.

In one embodiment, the customization information may be provided by customization information provider 244 out-of-session, such as by calling the user's mobile telephone and instructing the user that the web page is authentic by playing a recording of the user's voice, a favorite song, a prerecorded message or otherwise. The out-of-session customization information can be provided via output 243, which may be coupled to a conventional telephone line, with customization information provider 244 containing a suitable interface.

If customization information provider 244 provides the customization information via one or more tags, links, or code, the user's browser 264 will attempt to render the customization information to the user by sending a request corresponding to each instance of the customization information encoded in the one or more tags, links or codes. The request will contain an address of customization information server 238, as well as the code that identifies the specific customization information to be provided to that user. The code may be embedded in the link as a parameter, filename or otherwise, and such code is sent with the request by browser 264. Customization information server 238 receives the request and uses the code by searching database 224 to locate the customization information corresponding to the code. Customization information server 238 then provides the customization information corresponding to the code to browser 264, which displays it to the user as described herein. Customization information server 238 may provide all customization information it provides as described herein either directly via communication interface 210 or also via encrypted communication manager 212, which provides such information via communication interface using an encrypted SSL session. As described in more detail below, customization information server 238 may authenticate the user by using the persistent file before providing such customization information in order to help prevent the disclosure of any customization information to a party other than the user. However, if the code that corresponds to the customization information is unrelated to the user's user identifier and the customization information itself will not disclose the identity of the user, the risk of any such disclosure may be slight.

When the user receives the customization information such as via browser 264 and a monitor coupled to input/output 256 or out-of-session, the user may use it to authenticate the web site, and withhold providing information, such as confidential information, or refrain from using the web site if the customization is missing or different from the customization information the user selected or provided as described above. If the customization information is what was registered or otherwise expected as described herein, the user may provide confidential information via web pages provided by web application 240, believe information received therefrom, or both.

Although customization information is described herein as having a single instance for each user, multiple, different instances of customization information may be registered for each of some or all of the users, with each instance of customization information having a different meaning, e.g. one instance may mean that it is OK for the user to provide secure information, and a different instance of customization information for the same user to mean that information on the page has been validated as having been provided from an authentic source. Association of each instance of the customization information with the identifier of the user can be performed as described herein, along with an identifier of the instance, and each instance of customization information for a user may be perceptively different from the other instances for that user. Web application 240 then provides to customization information provider 244 the identifier of the user and an identifier of the instance of customization information that should be provided, and customization information provider 244 uses the identifier of the user and the identifier of the instance to retrieve and provide to the user the proper instance of customization information or a reference thereto in the same manner as was described above for the single instance of customization information for each user.

The User May be Pre-Confirmed

The user may not wish for his customization information to be provided when the user uses browser 264 to navigate to the site to a page that requires the user to provide confidential information, so as not to provide the customization information to anyone who merely has physical access to his or her client computer 260 and who navigates to the site. Thus, in one embodiment, customization information is not provided until the user provides a valid user identifier to web application 240.

Figure 5A:
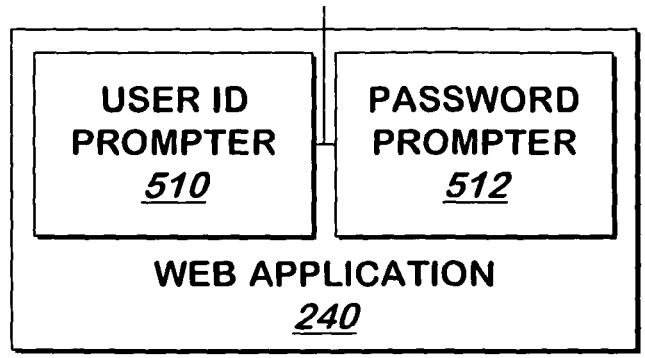
FIG. 5A is a block schematic diagram of the web application 240 of FIG. 2 according to one embodiment of the present invention.

FIG. 5A illustrates web application 240 in more detail according to one embodiment of the present invention. Referring now to FIGS. 2A and 5A, in such embodiment, when the user uses browser 264 to navigate to the web site operated by web application 240, user name prompter 510 of web application 240 provides to browser 264 a web page that requests the user's user identifier, but not the user's password or other confidential information. The user's customization information is not supplied to browser 264 with this page. The user uses browser 264 to supply the user identifier to web application 240. User identifier prompter 510 of web application 240 reads the user identifier via conventional techniques, such as CGI, and restricts the encrypted persistent file.

User identifier prompter 510 passes the encrypted persistent file, and optionally, the IP or MAC address of the user, to persistent file validator 242, which validates the persistent file, which optionally includes validating the IP or MAC address and/or certificate as described above. Persistent file validator 242 verifies that the signature corresponds to the remainder of the persistent file (e.g. by rehashing the remainder of the persistent file using the same hash algorithm and hash key as was used to build the signature, and comparing the hash result to the signature) and either indicates that the persistent file is valid, or indicates that the persistent file is not valid (e.g. if the hash result persistent file validator 242 generates does not match the signature or, optionally, if the IP or MAC address received from user identifier prompter 510 does not match the IP or MAC address stored in the persistent file, if such IP address is indicated as being static or if the certificate cannot be properly authenticated using conventional techniques). Persistent file validator 242 provides user identifier prompter 510 with the user's identifier from the persistent file and other information that may be stored in persistent file if persistent file validator 242 authenticates the user via the signature (e.g. the hash result it generates matches the signature and optionally, the IP or MAC address matches and/or certificate is authenticated).

If persistent file validator 242 indicates the persistent file is not valid, user identifier prompter 510 may deny access to some or all of the web site, including the requested web page. Otherwise, user identifier prompter 510 receives the user identifier from persistent file validator 242 and compares the user-supplied user identifier to the user identifier received from persistent file validator 242 and if the two user identifiers don't match, user identifier prompter 510 may deny access to some or all of the web site.

If the user identifiers match, or if the matching is not performed, after receiving the indication that the persistent file is valid, user identifier prompter 510 signals password prompter 512 and provides the user identifier of the user it received. When signaled, password prompter 512 provides the user identifier and a web page that prompts the user for a password, to customization information provider 244 as described above. Customization information provider 244 uses the user identifier to request the customization information from customization information database 224 as described above and provides to browser 264 the customization information received, either directly, out-of-session, or via one or more links, tags or code as described above, and the web page containing the prompt for the password or other confidential information.

The user can use the customization information thus received to authenticate the web site requesting the confidential information (i.e. the password), and either provide the confidential information such as the password, or not provide such confidential information, based on whether the user believes the customization information corresponds to that which is expected from the web site. If the user so believes, the user provides via browser 264 the password, and password prompter 512 receives it using conventional techniques, such as CGI, and validates it using conventional techniques, such as by comparing it to a stored password or account database 248 for the user identifier received as described above. If the password matches, password prompter 512 allows access to some or all of the remainder of the web site, including a requested web page.

User May Use an Alternate Computer System: Roaming

In one embodiment, a user may initially register using one client computer system 261 and then attempt to use server 202 using a different client computer system 260. FIG. 2A shows client computer system 261, which contains elements similar to or identical to elements 262-268 of client computer system 260. If the user uses client computer system 261 to initially register as described above, and then attempts to use client computer system 260 to request information from web application 240 as described above, the persistent file will not be present in file storage 266, it having been stored in the file storage of client computer system 261 when the user registered as described above. As a result, the user will not be allowed to log in, will not be allowed to see the customization information, or both, as described above.

In such embodiment, web application 240 prompts the user to identify that the user wishes to arrange roaming from the client computer system 260 the user is using to log in. This may be performed via a check box on the page that the user uses to supply his or her user identifier as described above, or may be automatically performed if web application 240 is unable to locate a persistent file for use as described above. If the user or web application 240 so identifies, web application 240 redirects the user to a web page provided by registration manager 222.

Registration manager 222 provides a web page that allows the user to register as described herein, or to allow roaming from the computer system 260 being used by the already-registered user. The user may attempt to register as described herein, or provide his or her user identifier (or the user identifier may be received by registration manager 222 as part of the redirect command) and indicate that roaming is desired (or such status may be received by registration manager 222 as indicated by registration and roaming checkboxes that were displayed on the web page initially provided by web application 240, which web application 240 receives via conventional CGI techniques and provides to registration manager 222, for example via parameters in the redirect command).

If registration manager 222 prompts the user for the user identifier and/or password (as opposed to receiving the user identifier from web application 240), registration manager 222 prompts the user via one or more web pages using any of the techniques described herein for prompting for such information, including providing customization information on the web page with the prompt, and/or splitting the prompts into two web pages, one requesting a user identifier and not displaying the customization information, and a second requesting the user's password and displaying the customization information. If registration manager 222 receives the password from web application 240, in one embodiment registration manager 222 may prompt the user for a password via customization information provider 244 to display the customization information. In another embodiment, the user is not prompted for his password.

If roaming is desired, in one embodiment, the user may indicate one of the following via the web page provided by registration manager 222: A) that the computer system from which the user is roaming should be "assigned" to that user (e.g. so that server 202 can authenticate the user from that computer system) indefinitely, B) that the computer system from which the user is roaming should be assigned to that user for a certain period of time indicated by the user, or C) that the computer system from which roaming is desired should be assigned to the user only for that session.

In the case in which roaming is desired, registration manager 222 receives the indication and the user identifier (and optionally, the password, received from a web page on which the user's customization information may be provided as described above), and responsive to the indication and the password corresponding to the password for the user identifier as stored in account storage 248, generates an alternate password that may be used by the user that will authenticate the user to registration manager 222. In one embodiment, the alternate password generated is different from the user's regular password.

Registration manager 222 provides the alternate password it generates to the user via an out-of-session communication means, such as transmission to an e-mail address, telephone, PDA or other device having an identifier (e.g. an e-mail address or telephone number) that is stored for that user in an account record stored by registration manager 222 or in account storage 248. The out-of-session identifier may be provided to registration manager 222 in advance by a system administrator or by the user during the initial registration process described herein. Alternately, the user may provide the out-of-session identifier and other information that can be used to authenticate the user, such as information that can be verified, such as a driver's license number or the like, which registration manager 222 validates as described above. All such information may be received via an SSL connection handled by encrypted communication manager 212.

Registration manager 222 optionally provides a web page notifying the user that the alternate password is available for retrieval via the out-of-session means. Registration manager 222 may do this for certain types of out-of-session identifiers, for example e-mail addresses, but not for others, for example, telephone numbers. The user retrieves the alternate password and registration manager 222 prompts, via a web page, the user for the alternate password it provided. The user supplies the alternate password and registration manager 222 receives it, for example, using conventional CGI techniques.

If the password received by registration manager 222 does not match the password it generated, or no such password is received, registration manager 222 will not take the further actions described below. If the password received by registration manager 222 matches the alternate password it generated for that user, registration manager 222 performs one of two actions, depending on whether the user indicated that the computer system being used by the user should be assigned to that user.

If the user indicated that the computer system being used by the user should be assigned to that user indefinitely, registration manager 222 provides via persistent file builder 230, persistent file signer 232 and persistent file encryptor 234, and encrypted communication manager 212 as described above to browser 264 a copy of the persistent file that was provided to the client original computer system 261 when the user registered as described above. Browser 264 receives the persistent file via an SSL connection and stores it into file storage 266 as described above. As described herein, other types of persistent files, such as Flash local shared objects containing information similar or identical to the persistent files described herein may be stored into file storage 266, for example via a Flash movie provided to browser 264 by registration manager 222. Registration manager 222 either instructs the user to attempt to log in again, or redirects the user's browser 264 to the log in page from which the user had been redirected to registration manager 222, registration manager 222 having stored the address of the web page when the user was redirected, the address optionally having been provided as a parameter of the redirect to registration manager 222.

In one embodiment, before building and storing the persistent file as described above, registration manager 222 will attempt to read any existing persistent file stored on the client computer system for that web site. If such a persistent file exists, registration manager 222 then sends it to persistent file builder 230, which generates a combined persistent file containing the information from the persistent file it retrieved and the information for the roaming user, and provides the persistent file for storage on the client computer system 260 as described above. In one embodiment, when generating such a combined persistent file, registration manager 222 removes information from the retrieved persistent file having an expiration date and time that is prior to the current date and time, which registration manager 222 requests from the operating system (not shown).

In another embodiment, instead of registration manager 222 reading the persistent file and storing the persistent file or combined persistent file, registration manager 222 passes to web application 240 information (e.g. as one or more parameters, which may be encrypted) that can be used to generate the persistent file, and web application 240 attempts to read the persistent file, and sends the information to persistent file builder 230 builds the persistent file or combined persistent file and causes it to be stored in file storage 266 as described above instead of registration manager 222 initiating this process as described above.

If the user did not indicate that the client computer system 260 being used by the user should be assigned to that user indefinitely, if the user indicated that the computer system from which roaming was desired should be assigned to the user only for that session, or for a limited period of time, in one embodiment, registration manager 222 either sends information to persistent file builder 230, which encodes these limitations into the persistent file or stores them into the user's record in account database 248 as described in more detail below. For example, to encode the limitations into the persistent file, registration manager 222 may set in the persistent file a "number of uses remaining" counter to 1, or retrieve from an operating system a current date and time and add the duration specified by the user on the web page the user used to indicate that the computer system 260 should be assigned to the user for a limited period of time, to produce an expiration time, and including the expiration time into the persistent file. Registration manager 222 initiates the sending of the persistent file to browser 264 for storage and use as described above.

In a similar manner to that described above, before storing any such restricted persistent file onto computer system 260, registration manager 222 may attempt to read any existing persistent file for the web site corresponding to registration manager, and cause persistent file builder 230, persistent file signer 232, persistent file encryptor 234 and encrypted communication manager 212 to build and store on client computer system 260 a combined persistent file if the client computer system contains an existing persistent file for that web site, as described above. Also as described above, registration manager 222 may provide the information to be added to the persistent file to web application 240, which may attempt to read any existing persistent file and initiate the storage of the persistent file or combined persistent file onto the client computer system 260 instead of registration manager 222 performing all of these functions.

Web application 240 enforces the limitations placed on the persistent file when the user attempts to log in. For example, web application 240 retrieves the date and time from the operating system clock (not shown) and compares it to the expiration date and time in the persistent file if the persistent file has such an expiration date and time. If the date and time from the system clock is later than the expiration date and time in the persistent file, web application 240 will not allow the user to log in as described above.

Regarding the one time use, in one embodiment, when the user logs in, web application 240 stores the signature or a serial number of the persistent file or other signature in the record holding that user's account number in account database 248 if the persistent file is marked for a one time use. If the user or another party attempts to log in, web application 240 compares the signature or serial number to those stored for that user, and does not allow the user to log in if the signature in the persistent file matches one of those stored for that user. In one embodiment, persistent files that are designated as one time use also have an expiration date and time that may be stored with the persistent file, using a default period such as a week from the date and time the persistent file is generated. Web application 240 first checks the expiration date and time as described above and then verifies the persistent file has not been used before as described above. This allows signatures stored for a user to be purged from account database 248 after the default period.

In still other embodiments the limitations placed on the use of client computer system 260 are enforced using other means. For example, the expiration date and time and a serial number of the persistent file may be stored by registration manager 222 in account storage 248 instead of storing the expiration date and time in the persistent file. In such embodiment, each user's persistent files are assigned a serial number unique to that user, and the serial number is stored in the persistent file, and hashed as part of the persistent file's signature. When the user attempts to use the persistent file, web application 240 retrieves the serial number from the persistent file via persistent file validator 242 and then looks up the expiration date and time corresponding to the user and serial number of the persistent file in account storage 248 and retrieves the current date and time from the system clock. If the current date and time from the system clock is later than the expiration date and time for the persistent file, or no entry is stored for that user and that serial number, web application 240 does not allow the user to log in or otherwise treats the persistent file as invalid, and if the entry exists but the current date and time is after the expiration date and time stored for that user and that serial number, web application 240 removes from account database 248 the entry containing the serial number and expiration date and time for that persistent file for that user.

Prevention of Keystroke Capture

In one embodiment, to guard against keystroke capture programs that may be installed on computer systems, and that would allow an intruder to surreptitiously capture the user identifier and password of a user who is roaming on a computer system over which that user may not have control, in one embodiment, the alternate password may be stored in the user record corresponding to the user identifier in account database by registration manager 222 when it provides it to the user as described above. The user may use this password instead of his or her regular password when using a persistent file for roaming as described above. Web application 240 prompts the user for his or her alternate password, and warns the user not to use his or her regular password when web application 240 detects a persistent file marked as one time use or limited duration use as described above. Web application then uses the alternate password stored in account database 248 instead of the user's regular password when comparing a password supplied by the user as described above.

In still another embodiment, web application 240 supplies a different alternate password via the out-of-channel communication method described above each time the user attempts to log in by supplying a user identifier and web application 240 detects an unexpired limited duration persistent file on the computer system 260. Web application 240 then prompts the user for his or her password by instructing the user to retrieve it from the out-of-channel communication method and again warns the user not to use his or her regular password. Web application 240 then matches the password supplied by the user to the new alternate password whenever the user attempts to log in using this method.

In one embodiment, registration manager 222 prompts the user to select any one of the above methods based on the user's trust of the computer system 260, and registration manager 222 records the user's record in account storage 248 with the type of method the user has selected and the serial number of the persistent file. Web application 240 then performs the method described above based on the stored type for the record in account storage 248 corresponding to the user identifier whenever it detects the serial number of the persistent file described above.

Roaming without Customization Information

In one embodiment, it isn't necessary for the user to register to receive one of the various types of persistent files described above when the user registers on a client computer system 261 and then attempts to log in using a different client computer system 260 that does not have a stored persistent file.

For example if desired, the user can simply use client computer system 260 without any persistent files. The user can view web pages or other communications as described herein, but will not see that user's customization information displayed with such communications. As described in more detail below, when viewing communications in this manner, if a password is required, the user may obtain, and web application 240 will compare, an alternate password, such as a one-time-use password, to prevent the user's regular password from being recorded by keystroke logging programs as described above, or the user can continue to use his or her regular password.

For example, if web application 240 is not able to detect a persistent file, or the persistent file it detects does not correspond to the user identifier, to respond to the first request for a web page from such a user during a single session, web application 240 may provide a web page that instructs the user that customization information is not available from this computer system 260, warning the user that while using this computer system without registering it, links to this web site should always be typed, and not followed or pasted, and containing a link to registration manager 222 to allow the user to request a roaming persistent file as described above and a link to allow the user to continue without viewing customization information. If the user clicks the link to registration manager 222, operation continues as described above to allow the computer system 260 to be registered and receive a persistent file as described above.

If the user elects to continue without viewing customization information, web application 240 will allow the user to log in and view web pages using a user identifier and password. However, when web application sends the web page to customization information provider 244, it provides a special user identifier that is different from the actual user identifier of the user that indicates that the user's customization information should not be shown (and that neither customization information provider 244 nor customization information server 238 should attempt to authenticate the user in the embodiments in which they attempt to do that using the persistent file). Customization information provider 244 provides a message in place of the user's customization information, either by including the message into the web page, or including one or more links, tags or computer code containing a reference to customization information server 238. The code that would be included that identifies the user's customization information is replaced by customization information provider 244 with a code to a predefined message in database 224, instructing the user that the computer system 260 from which the user is requesting web pages is not registered, and reminding that user to be more careful when using such a computer, such as by not following or copying links to this web site, instead typing URLs into the browser directly. If the user's browser will send one or more requests to customization information server 238 as described above, customization information server 238 will provide that message in place of the user's customization information for each such request.

In one embodiment, before displaying a page requesting a password in this manner, web application 240 may first provide to the user an additional web page containing the warnings described above, with a link to registration manager 222 to allow the user to obtain a one-time-use password before it prompts the user to provide his or her password as described above, to ensure that the user sees the message.

If the user clicks the links to registration manager described above, registration manager 222 generates, stores in account database 248 and provides to the user an alternate password via the user's out of channel identifier stored for that user in account database 248. Registration manager 222 then provides a web page instructing the user to retrieve the alternate password and a link back to web application 240 for the user to complete the log in sequence. Web application 240 authenticates the user using the alternate password and if the password provided by the user matches the alternate password stored, web application 240 continues to provide access to the web site, and continues to display some or all web pages with the warning instead of the user's customization information as described above, and web application removes the alternate password from the user's record in account database 248. If the password provided by the user does not match the alternate password stored, web application 240 denies access to some or all of the web site, including any requested pages.

Database May be Centralized

In one embodiment, database 224 does not reside in server 202 but instead is replaced by database 224A that is accessible to more than one server 202 via network 254 and otherwise operates as database 224. Each such more than one server may serve the same web site as server 202 or a different web site. In such embodiment, there is more than one server 202 and either each server registers users and provides customization information as described above, but shares the central database 224A in place of database 224, or only a fraction of the servers 202 register users, with other servers making use of the customization information the users identify or provide to such registering server or that is provided by such registering server as described above.

In one embodiment, each server 202 uses a number that is unique among the various servers for the same user, such as a web site number or server number appended to a user identifier, such as a social security number of the user, to access a user's record in database 224A. In such embodiment, customization information provider 244A and customization information server 238A that are accessible to multiple servers 202 may be used in place of customization information provider 244 and customization information server 238 so that any server 202 does not have access to the customization information of the user. Customization information provider 244A and customization information server 238A operate in the same manner as customization information provider 244 and customization information server 238 to send to the user the customization information with the web page. Customization information server 238A may contain its own encryption capability similar to encrypted communication manager 212 so that customization information may be sent via an encrypted SSL session, and each of database 224A, customization information provider 244A and customization information server 238A may be coupled to network via a communication interface (not shown) similar or identical to communication interface 210.

In one embodiment, either database 224A or customization information provider 244A or customization information server 238A, and web application 240 or customization information provider 244, use conventional authentication techniques to authenticate requests for customization information or requests to send a web page with customization information. Such authentication techniques may include passwords, signatures, digital certificates or other conventional techniques. Such requests may be sent via encrypted communication manager 212 so that conventional SSL connections may be used to enhance security.

E-Mail Messages May Cause Customization Information to be Displayed to Allow the User to Authenticate the E-Mail Message.

The system of FIG. 2A may be employed to allow a user to authenticate an e-mail message. In one embodiment, the message may contain HTML code that causes the user's customization information to be displayed as described in more detail below. The customization information may be displayed as part of the e-mail message, or when the user clicks on or pastes into his or her browser a link that is supplied with the e-mail message. As noted above, the user identifier, password and other account information that is described above as being stored by web application 240 is stored in account database 248. In addition, account database 248 contains an e-mail address for each user of system 200, of which there may be as many as several million. The e-mail address may be supplied by a user, for example, during the registration process described herein, received by registration manger 222, which stores it into account database 248, or a system administrator may store the user's e-mail address into account database 248 using any conventional data transfer technique.

Message manager 246 prepares a message containing information for each of multiple users, and each such message may contain common information as well as custom information prepared for that user or for each user in a group of users. The message may be in the form of an e-mail message, or may just contain the body of the message, such body to be incorporated into a complete e-mail message by customization information provider 244. In one embodiment, the message is coded as an HTML e-mail message or its body. Message manager 246 passes the message, the e-mail address to which the message is to be sent if the message is not coded as an e-mail address, and the user identifier of the user to which the message is being sent, to customization information provider 244.

Customization information provider 244 retrieves the customization information associated with the user identifier and adds it to the message. Customization information provider 244 may provide the customization information in the form of text, a link, or one or more tags (e.g. an IMG tag) or any or all of these, with the link, or each such tag containing a link that relates back to customization information server 238 and will cause customization information server 238 to provide the user's customization information (e.g. using a code stored associated with the user's customization information), optionally via a secure session using encrypted communication manager 212. Customization information provider 244 may include in the message Flash, Java, Javascript, or other computer code that causes the customization information to be displayed, or customization information server 238 may provide such computer code in response to a request resulting from each of the one or more tags or the link.

If a link, or one or more tags or computer code is used, customization information provider 244 assigns in database 224 a code to the link or each link in the one or more tags or the code that can be used to identify the user. For example, customization information provider 244 may select a 35 character identifier that is unique to the user identifier, and store the 35 character identifier associated with the user identifier in database 224 and also store the 35 character identifier in the link, one or more tags, or code for example, as a filename or a parameter in a reference (e.g. a URL) to customization information server 238.

In one embodiment, customization information provider 244 builds the message it receives into an e-mail message if the message it receives is not already in such format. To address the message, customization information provider 244 uses the e-mail address supplied by message manager 246 or retrieves the e-mail address from account database 248 in the record corresponding to the user identifier it received. In one embodiment, the message is built into an HTML e-mail or a text e-mail, based on a setting received from the user during the registration process and stored by registration manager 222 in account database 248.

Customization information provider 244 provides the e-mail message to communication interface 210, which forwards it via network 254 to the appropriate e-mail server (not shown) corresponding the e-mail address of the message. The user uses e-mail client 268 to retrieve the message and view the message via input/output 256 of communication interface 262. The message may contain the customization information as text, as a link, or as one or more tags containing links, or code (e.g. Javascript or Java) or code plus one or more links. E-mail client 268 may display the message and operate any code and retrieve and display the customization information specified by the one or more links (either as links, tags or code) via one or more requests passed to communication interfaces 262, 210. Communication interface 210 forwards the request to customization information server 238.

As described above, the request contains coded information from the link (e.g. the 35 character identifier) corresponding to the user's account number, which customization information server 238 uses to retrieve from database 224 the customization information for the user. Customization information server 238 then provides the customization information via encrypted communication manager 212 and communication interfaces 210, 262 to e-mail client 268. E-mail client 268 displays the customization information with the message as described above.

If e-mail client cannot display the customization information, the user may click on the link contained in the message, which causes browser 264 to be started if it is not already running and to generate a request based on the link as described above. Alternatively, the user may paste the link into browser 264, which generates the request based on the link as described above and displays the customization information received in response thereto.

The user may then use the customization information to determine whether the e-mail message is authentic. If the customization information matches that expected by the user, the user can take actions appropriate with an authentic e-mail message, such as believing its contents or clicking on links it contains. If the customization information does not match that expected by the user, the user can take actions appropriate to an unauthentic message, such as deleting the message or refraining from believing its contents or clicking on a link contained therein.

In one embodiment described in more detail below, message manager 246 or customization information provider 244 codes the message as a multi part MIME message, with customization information provider 244 adding the one or more tags or code to an HTML-encoded part of the message and one or more links to the text-encoded alternate part of the message.

In one embodiment, when customization information server 238 receives the request, it also receives the persistent file stored in file storage 266. Customization information server 238 validates the persistent file (which it may do via persistent file validator 242) and compares certain information in the persistent file with other information, such as information stored in database 224 or account database 248 and provides or does not provide the customization information based on the result of the comparison. For example, customization information server 238 may verify that the account number in the persistent file matches that to which the code in the request corresponds. If the account numbers do not match, customization information server 238 does not respond to the request as described above, and if the account numbers do match, customization information server 238 responds to the request as described above.

In one embodiment, an indicator as to whether customization information server 238 should use the persistent file as described above is stored in database 224 or account database 248. Customization information server 238 checks the entry in the database 224 or 248 corresponding to the coded information in the link for whether it should use the persistent file as described above. If the persistent file is not received, but the indicator indicates that the persistent file is required, customization information server 238 does not provide the customization information.

The indicator may be placed in database 224 or account database 248 by a system administrator, or by registration manager 222 which may ask the user if their e-mail client is of a type that supports cookies. Registration manager 222 may attempt to store the cookie as part of the registration process for use as described herein, even if the user's e-mail client does not support the use of cookies.

In another embodiment, the indicator is initialized in database 224 or account database 248 as described above, or initialized to not require the persistent file when the user registers. Customization information server 238 changes the indicator in database 224 or database 248 to require the persistent file upon receipt of the proper persistent file in response to a request generated in response to an e-mail as described above. In this manner, if the user upgrades his or her e-mail client 268 after registration, it will be detected and required from then on.

Authenticating Text E-Mails

As noted above, if the user's e-mail client 268 does not support HTML e-mail, a link may be used to allow the user to authenticate the message using browser 264. In such embodiment, when customization information provider 244 receives the message from message manager 246, customization information provider 244 may place both the one or more tags described above and a link into the message. The link may correspond to a web page and may also contain the coded information described above that can allow customization information server 238 to identify the customization information as described above. In such embodiment, the code for the link to allow browser 264 to authenticate the message may be the same code as is used in the tag or computer code or a different code (which customization information provider 244 stores in database 224 associated with the user identifier it receives from message manager 246 as described above) and the link may be the same or a different link as is used in the one or more tags or computer code.

In one embodiment, the message received from message manager 246 contains two communications in each of two parts. One part contains the communication encoded as an HTML e-mail and the other part contains the same or a different communication encoded as a text e-mail. Customization information provider 244 adds the one or more tags to the first part and the link to the second part. The two parts are then transmitted as a single e-mail message, with the first part encoded as an HTML e-mail message and the second part used as an alternate encoding, encoded as text e-mail. The message may be encoded as a multi-part MIME message, or using any other conventional e-mail encoding.

In another embodiment, the message contains only the second part, and not the first part, described above. Message manager 246 may generate only the second part of the message in response to a field in account database 248 for each user that indicates whether the user's e-mail client 268 can handle HTML e-mail, specified by the user upon registration as described above. If the field for a user in account database 248 indicates that the e-mail client 268 cannot handle HTML e-mail, message manager 246 generates only the second part of the message and omits the first part as described above. Customization information provider 244 provides the link, but not the one or more tags, in such message.

When the user views the message, the user's e-mail client 268 will display one part or the other if both parts are provided, or the second part if only that part is provided. If the user's e-mail client 268 only displays the text part, or if only the text part is provided in the message, the link will be displayed along with the rest of the message. The user can click on the link or paste it into browser 264, which causes the user's browser 264 to start and to generate a request corresponding to the link (or the user can start browser 264 and cut and paste the link into the browser thereby causing the browser to generate the request.

Browser 264 sends the request via communication interfaces 262, 210. Communication interface 210 forwards the request to customization information server 238. The request will have the coded information from the link contained therein, and customization information server 238 uses the coded information to locate the customization information in database 224 as described above. Customization information server 238 provides the user's customization information as described above in response to the request, via encrypted communication manager 212, and communication interfaces 210, 262. Communication interface 262 forwards the response to browser 264, which displays the customization information. In one embodiment, other information in the link (such other information not being a part of the one or more tags described above) causes customization information server 238 to include the customization information it retrieves as described above as part of a web page containing other information, to provide a more elegant user interface when the link is used instead of the tags or computer code.

The user can then use the response to the request to determine whether the original e-mail message was authentic. If the customization information is received as expected, the user can treat the message as authentic, for example by believing information contained therein or linked thereto, or by clicking on links contained therein or linked thereto. If the customization information is not provided as expected, the user can treat the message as not authentic, for example, by disregarding the information contained therein or linked thereto, or by not clicking on a link contained therein or linked thereto, or by discarding the message.

Flash

In one embodiment, computer code provided with the e-mail may include a conventional Flash .swf movie file or other similar computer code. The computer code may display the remainder of the message, the customization information, or both. In such embodiment, the message generated by message manager 246 may contain a flash movie file, or a reference thereto (such as via an OBJECT or EMBED tag, which may be specified via Javascript code) to be displayed to the user by the user's e-mail client 268 or browser 264 in addition to, or in place of, the remainder of the message. In one embodiment, rather than including the computer code into the message, customization information provider 244 provides a reference to the computer code, which it stores in database 248. The reference may be a conventional OBJECT or EMBED tag with a link containing the code that identifies the record in database 224 in which the computer code is stored.

The code may be executed by e-mail client 268 or by browser 264 when the user attempts to read the message. Although the code may be contained in the message in one embodiment, in another embodiment, when the user's e-mail client 268 or browser 264 requests the object specified in the OBJECT or EMBED tag, customization information server 238 retrieves the code from database 224 or builds the code (e.g. a .swf file containing the customization information) and provides it in response to the request.

As noted above, in other embodiments, the .swf file is generated in advance of the request and stored in database 224, either by customization information provider 244 using the customization information for the user identifier it receives from message manager 246 at the time it adds the customization information to the message as described above, or by registration manager 222 after the customization information is received during the registration process.

In one embodiment, the persistent file is used as described herein. In another embodiment, instead of a persistent file or in addition to it, either the .swf file itself contains encrypted information that would have been encoded into the persistent file, or registration manager 222 builds via persistent file builder 230, persistent file signer 232 and persistent file encryptor 234, and instructs the user's browser 264 to store via an SSL connection provided by encrypted communication manager 212, a Flash local shared object in file storage 266, as the persistent file. Instead of using a cookie as the persistent file, web application 240 receives the information encoded into the .swf file by the Flash movie, or the Flash movie retrieves and provides to web application 240 information from the Flash local shared object stored in file storage 266 and web application 240 provides it to persistent file validator 242, which processes it in the same manner as it processed the cookie as described above. Other elements may employ other types of persistent files to serve the role of the cookie in a similar manner.

In one embodiment, in the manner similar to that described above, before the customization information is provided for display to the user by the Flash movie or other similar code, the user may first enter a user identifier, or the Flash movie may obtain it without user interaction by retrieving it, as well as other information such as a hash of the user identifier and other information in the Flash local shared object, from the Flash local shared object. The Flash movie receives the user identifier and optionally other information and sends a request for the customization information to customization information server 238 with the coded information identifying the customization information as described above, such request having been coded into the Flash movie by customization information provider 244 as described above.

Customization information server 238 receives the request, and requests, via conventional techniques such as CGI, from the Flash movie the user identifier it received from the user and the information from the Flash local shared object, and customization information server 238 may send such information to persistent file validator 242 to validate the information and return the user identifier. Persistent file validator 242 decrypts the user identifier and checks the signature, IP or MAC address and/or certificate in the same manner as described herein with respect to the persistent file, signaling customization information server 238 if the Flash local shared object is not valid and providing the user identifier and other information otherwise. Customization information server 238 compares the decoded user identifier with the user identifier corresponding to the coded information (e.g. the 35 character code) in the request.

If the user identifier is authenticated as described above, customization information server 238 will provide, via encrypted communication manager 212 the proper customization information in the form of a file containing text, an image or a movie clip to be integrated into the Flash movie (if the user identifier does not match, customization information provider 244 may provide different text, a different image or a different movie clip indicating an error, and the Flash movie may reprompt the user for their user identifier). The Flash movie displays the customization information received, allowing the user to authenticate the sender of the e-mail message.

In still another embodiment, the one or more Flash movies provided by message manager 246 and/or customization information provider 244 in an e-mail message are self contained and do not require the use of customization information server 238 to display the customization information. In such embodiment, customization information provider 244 builds a Flash movie that operates as described below, and may incorporate the message it receives from message manager 246 or be provided in addition to it. The Flash movie is provided by message manager 246 in the e-mail message, to be displayed by the e-mail client 268 or browser 264, either one running the Flash Player plug-in commercially available from Macromedia, Inc. of San Francisco, Calif.

Figure 10A:
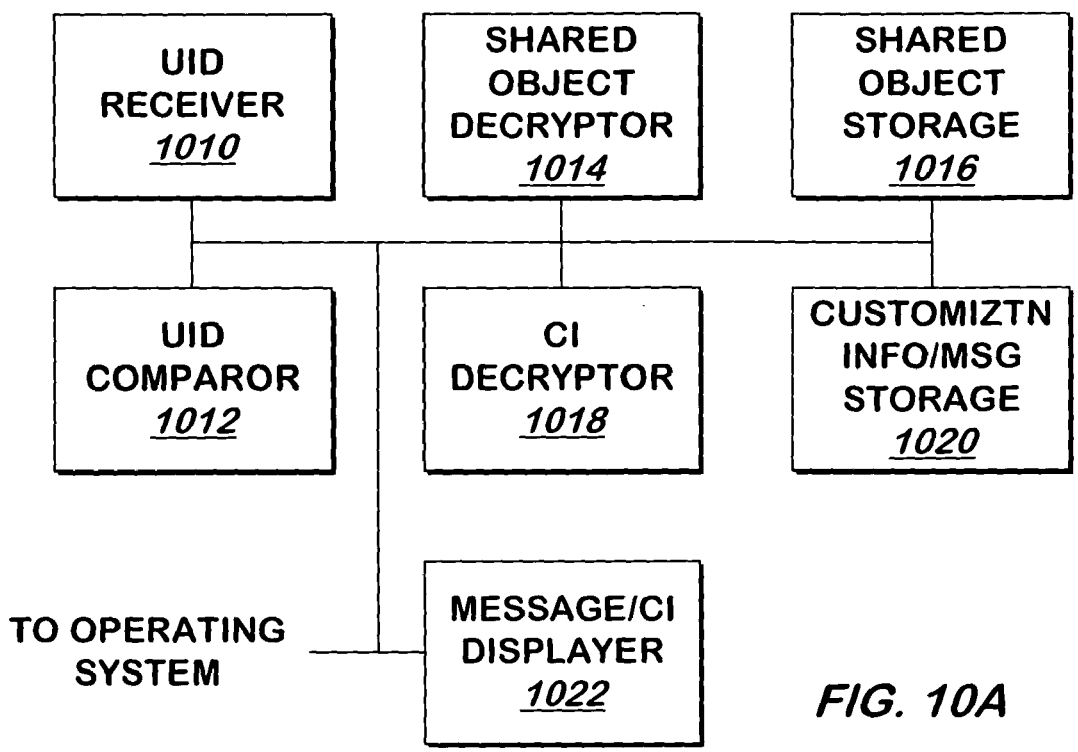
FIG. 10A is a block schematic diagram of a Flash movie or other device used to display an e-mail message and customization information according to one embodiment of the present invention.

Referring now to FIG. 10A, a block schematic diagram of a Flash movie or other device used to display an e-mail message and customization information is shown according to one embodiment of the present invention. User identifier receiver 1010 generates a page containing editable text elements that prompt the user for his or her user identifier via an operating system (not shown). The user provides the user identifier to the operating system, which provides it to user identifier receiver 1010. User identifier receiver 1010 provides the user identifier to user identifier comparator 1012. In another embodiment, user identifier receiver 1010 does not prompt the user. Instead, the user identifier is coded into user identifier receiver 1010 by customization information provider 244 of FIG. 2A and user identifier receiver 1010 provides that user identifier to user identifier comparator 1012.

User identifier comparator 1012 signals shared object decryptor 1014 upon receipt of the user identifier. When signaled, shared object decryptor 1014 retrieves an encrypted user identifier from a local shared object from shared object storage 1016 or from a portion of the Flash movie that contains such user identifier, decrypts it, validates it by rehashing one or more portions of it and comparing the result with a signature contained therein. Shared object decryptor 1014 then provides the decrypted user identifier to user identifier comparator 1012 if the Flash local shared object is valid, or signals user identifier receiver 1010 to identify an error if the Flash local shared object is not valid.

If shared object decryptor 1014 provides the user identifier to user identifier comparator 1012, user identifier comparator 1012 compares the user identifiers received from user identifier receiver 1010 and shared object decryptor 1014. If these two user identifiers match, user identifier comparator 1012 signals customization information decryptor 1018, and otherwise, signals user identifier receiver 1010 to reprompt the user.

When signaled, customization information decryptor 1018 retrieves and decrypts customization information stored in customization information/message storage 1020, which may be conventional memory or disk storage, and provides it to message/customization information displayer 1022. Message/customization information displayer 1022 receives the decrypted customization information and displays it, and the message via the operating system (not shown) for use by the user as described above.

Authentication of a User and a Payment Mechanism

In one embodiment, the user may use the customization information he has registered as described above to authenticate a web site for purposes of authorizing one or more payments, and the user may be authenticated to the web site or other computer system using the persistent file.

Figure 2B:
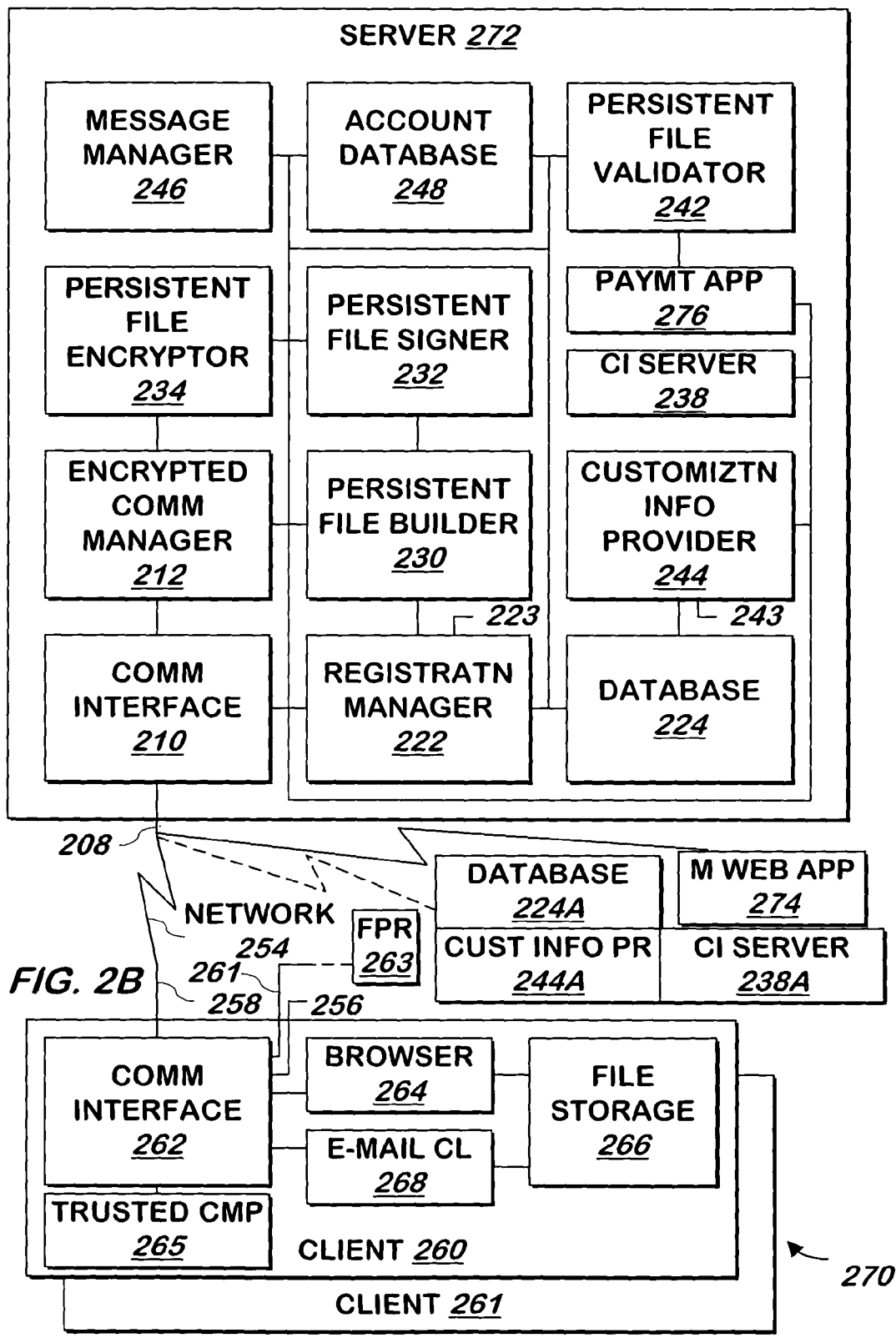
FIG. 2B is a block schematic diagram of a system for allowing a user to authenticate a computer system, and the same or a different computer system to authenticate the user, for the purpose of authorizing a payment according to one embodiment of the present invention.

Referring now to FIG. 2B, a system for allowing a user to authenticate a computer system, and the same or a different computer system to authenticate the user, for the purpose of authorizing a payment or other transaction involving a payment instrument such as a credit card is shown according to another embodiment of the present invention. The system 270 of FIG. 2B operates in the same manner as system 200 of FIG. 2A, except that certain elements have been added as will be described below. Server 272 is identical to server 202 except that web application 240 has been replaced by payment application 276, which may have some or all of the features of, and operate in a manner similar to, web application 240, in addition to those features and operations described herein. Server 272 may be used in a system which also contains one or more servers 202 of FIG. 2A.

The user may initiate a transaction using merchant web application 274. Merchant web application 274 contains a conventional application program for operating an on-line shopping web site that the user can use to browse products, and add them to a shopping cart or otherwise indicate acceptance of a purchase or license or rental or other transaction regarding one or more goods or service and indicate that the user wishes to pay for the transaction. Merchant web application 274 then calculates a total amount to be charged to the account of a financial institution, such as a bank credit card, debit card, checking account and the like.

Merchant web application 274 then provides a redirect command to browser 264, such redirect command containing a web address or URL that corresponds to payment application 276 specifically, and server 272 more generally. In one embodiment, there may be different payment applications 276 on the same server 272 or different servers 272, with each such payment application 276 processing a particular type of payment instrument (e.g. MASTERCARD, DISCOVER, PAYPAL, etc.). In another embodiment, the same payment application 276 processes payments for various types of payment instruments, with each type of payment instrument corresponding to a different web address or URL or parameter in a address or URL. In any of these embodiments, merchant web application 274 builds the proper URL or address based on a selection of a type of payment instrument to use that is made by the user on a web page provided by merchant web application 274. In still another embodiment, a single payment application 276 is used for all types of payment instruments and payment application 276 either provides the web page to allow the user to select the type of payment instrument or uses a pre-stored type of payment instrument for the user.

Web merchant application 274 builds into the redirect command certain parameters to the web address or URL used in the redirect command. The parameters may correspond to a merchant identifier that uniquely identifies the merchant to payment application 276, a transaction identifier that uniquely identifies the transaction to web merchant application 274, and the amount of the transaction to which the payment instrument is to be charged. In one embodiment, web merchant application 274 hashes these parameters and also includes the hash result as a signature in the URL of the redirect command.

Browser 264 receives and executes the redirect command by sending to communication interface 210 via network 254 and communication interface 262 a request to the URL or address specified with the redirect command and including the parameters as described herein. Communication interface 210 receives the request and forwards it to payment application 276. In the embodiments in which multiple payment applications 276 reside on the same server 272, communication interface 210 sends the request to the payment application corresponding to the request.

Payment application 276 is a conventional web application program that operates in a manner similar to some or all of web application 240 described above, except as noted herein. Payment application 276 internally stores the parameters from the request and validates the parameters by rehashing them and comparing the result to the signature received with the request. If the parameters are valid, payment application 276 validates the merchant identifier against a set of merchant identifiers and account numbers it stores in account database 248. Payment application 276 then authenticates the user in any of the manners for authenticating a user described above as described for web application 240 of FIG. 2A. (If any of these validations or authentications fail, payment application 276 provides a redirect command to browser 264 containing an error code and the transaction identifier, as well as a URL corresponding to merchant web application 274 for error processing.)

In one embodiment, to authenticate the user, payment application 276 provides the persistent file to persistent file validator, 242, which decrypts the persistent file, validates it as described above, and provides the user identifier to payment application 276. Payment application 276 provides one or more web pages requesting the user to enter his or her user identifier and password. At least one of the one or more web pages, requesting the user identifier and password, may be provided via communication interface 210 and optionally via customization information provider 244 in the manner described above with reference to web application 240 of FIG. 2A. Briefly, for one of those manners, payment application 276 provides a web page via communication interface 210 to browser 264 that requests a user identifier, receives the user identifier and the information from the persistent file, and compares it to the user identifier in the persistent file, and if the user identifiers are the same, sends to customization information provider 244 the user identifier and another web page that requests the password for processing as described above. In another manner, payment application 276 sends the user identifier from the persistent file and a web page requesting both the password and user identifier. Customization information provider 244 adds the customization information to any web pages it receives, either directly, or via one or more tags or links or computer code that relate to customization information server 238 and contain a code identifying the user's customization information and provides the resulting one or more web pages to browser 264, optionally via encrypted communication manager 212. Browser 264 displays the web pages and any customization information as described above, allowing the user to authenticate the web site and decide whether to provide the user identifier, password or both, based on whether the customization information provided matches his or her expectation of the customization information as described above.

In one embodiment, any or all of the web pages initially generated by payment application 276 contain an indication of the charge amount and instructions that the user is providing the user identifier, password or both, to authorize the payment amount indicated, or such instructions and a means of indicating authorization may be provided on still another web page. In one embodiment, payment application 276 also displays some or all of the financial instrument information (e.g. last four digits of a credit card number and the type of the card, such as VISA or DISCOVER) that is stored in account database 248 for that user identifier on any or all of such web pages that indicate authorization is being indicated. If there are more than one financial instrument stored for the user, a default one may be used, with an option that can be indicated that causes payment application 276 to generate a web page allowing the user to select from among the various financial instruments to be used for the transaction, and payment application internally stores the one selected. The financial instrument information may be stored in database 248 by a system administrator, or entered by the user during a registration process similar to that described above.

Payment application 276 receives the password, and verifies that it matches a password corresponding to the user as described above in database 248. If the result of the check is positive, payment application 276 either: A) charges the financial instrument in the amount received, using account information stored in account database 248 corresponding to the merchant identifier and generates or receives an authorization identifier indicating the transaction was authorized, and provides a redirect command to browser 264 that will cause browser 264 to transmit a request to merchant web application 274, or B) requests authorization to charge that amount and issues or receives the authorization identifier and optionally stores the transaction amount, the authorization number and the merchant identifier in account database 248 and then redirects browser 264 to merchant web application 274. The redirect command contains parameters containing the transaction number, the authorization number, and optionally an indication of whether the transaction succeeded or failed, along with a signature of these items produced by hashing some or all of them. Merchant web application 274 stores the parameters, reproduces the signature and compares it with the signature received as a parameter. If the signatures do not match, merchant web application 274 does not continue processing the order, and otherwise, continues with the processing as will now be described.

If the charge is not made by payment application 276 (e.g. only an authorization for such a charge is obtained as described above), it may be made at this time or at a later time by merchant web application 274, providing the authorization identifier via another session, either to payment application 276 or to a financial institution, clearinghouse or other entity, which may be connected to network 254. Merchant web application 274 may then initiate the provision of goods or services to the user (via a stored, or user-entered name and address) and may provide to browser 264 a web page so indicating that the transaction is complete, and may provide an e-mail to e-mail client 268 similar information.

Trusted Computing and Biometric Authentication of the User.

It isn't necessary to employ the persistent file to authenticate the user. In one embodiment, any of the entities described above that use a cookie, Flash local object or other type of persistent file or the contents thereof, and/or a user identifier, password, or both, to authenticate a user, may authenticate the user using other means, and such other means may be performed in conjunction with registration manager 222. For example, biometric authentication or physical token authentication may be used via a trusted computing or other similar capability.

Referring now to FIGS. 2A and 2B, in one embodiment, when registration manager 222 registers the user as described above, instead of placing a persistent file on the user's computer system, registration manager 222 authenticates trusted computing subsystem 265 and requests from trusted computing subsystem 265 a trusted computing identifier that trusted computing subsystem 265 can provide when it has authenticated the user. If trusted computing subsystem 265 is not present, or does not respond, or cannot be validated, registration manager 222 stores the persistent file as described above and operation of the system 200 or 270 proceeds as described above. In one embodiment, trusted computing subsystem 265 may respond that it is present, but that the user has not authenticated himself or herself to it yet. In such embodiment, registration manager 222 prompts the user to use trusted computing subsystem 265 to authenticate himself or herself, or indicates to trusted computing subsystem 265 to provide such a prompt and trusted computing subsystem 265 complies.

Trusted computing subsystem 265 may consist of hardware and software that can authenticate itself using conventional techniques and that the user can use to authenticate himself or herself. A user registers to trusted computing subsystem 265, for example, by inserting a uniquely numbered token into a USB port 261 of communication interface 260 or placing his or her finger on a fingerprint reader 263 or other biometric information reader such as a voiceprint analyzer, retina scanner or the like attached via USB port 261 and allowing trusted computing subsystem 265 to read the fingerprint placed thereon, a process that may be repeated a number of times for increased accuracy.

Once the user has registered, to authenticate himself or herself to trusted computing subsystem 265, the user can insert his or her uniquely numbered token into USB port 261 or place his or her finger on the fingerprint reader 263 or otherwise authenticate himself or herself to trusted computing subsystem 265.

Once the user has authenticated himself or herself, trusted computing subsystem 265 provides evidence of its validity to registration manager 222, for example, using conventional public key certificate and provides to registration manager 222 a trusted computing identifier that is unique to trusted computing subsystem 265 and optionally that user. Registration manager 222 checks the digital certificate using conventional means, and if it determines the trusted computing subsystem 265 has a valid certificate (a process referred to herein as authenticating or validating the trusted computing facility), registration manager 222 stores into database 224 or account database 248 the trusted computing identifier it receives from trusted computing subsystem 265.

When an entity, such as customization information provider 244 or customization information server 238 provides the customization information as described above, the entity that instructed it to do so, such as message manager 246 may request from trusted computing subsystem 265 the identifier indicating the user has been authenticated and provide it to customization information provider 244 or customization information server 238, which compares it to the trusted computing identifier in the database for the user having the user identifier it receives as described above if trusted computing subsystem 265 provides evidence of its authenticity and customization information provider 244 or customization information server 238 authenticates such evidence using conventional techniques such as those involving a public key certificate. If the trusted computing identifier received matches that stored, customization information provider 244 or customization information server 238 provides the customization information as described above, and otherwise it does not. In other embodiments, customization information provider 244 or customization information server 238 themselves attempt to authenticate trusted computing subsystem 265 and to retrieve the trusted computing identifier from trusted computing subsystem 265, and compare it to the trusted computing identifier stored for the user identifier in account database 248, such identifier having been stored there by registration manager 222 when the user registered. If the trusted computing identifier does not match the trusted computing identifier stored for the user or trusted computing subsystem 265 is not valid, customization information provider 244 or customization information server 238 will provide an error message in place of the customization information.

In still another embodiment, the entity that requests customization information provider 244 or customization information server 238 to provide the customization information, validates, and requests, receives and compares the trusted computing identifier from, trusted computing subsystem 265, performs the comparison with the identifier stored in account database 248 and only makes such request if it determines that trusted computing subsystem 265 is authentic and the trusted computing identifier received matches one stored for that user in account database 248, such trusted computing identifier having been stored in the user's account record in account database 248 by registration manager 222 during the registration process. In this embodiment, the trusted computing identifier may be used in place of the user-supplied user identifier, password or both, or may be used in addition to either the user identifier, password or both.

When an attempt is made to retrieve the trusted computing identifier as described above, if trusted computing subsystem 265 indicates that it is installed but the user has not authenticated himself or herself, the entity requesting the trusted computing identifier instructs trusted computing subsystem 265 to instruct the user to authenticate himself or herself to trusted computing subsystem 265 or that entity prompts the user to do so. If no response is received or a response is received indicating that no trusted computing subsystem 265 is present on client system 260, the entity making the request attempts to retrieve the persistent file and uses it as described above.

In one embodiment, roaming is performed by moving at least a part of trusted computing subsystem 265 from one client computer system 260 to another 261 and so the installation of a persistent file on the client computer system 260 which is being used by the roaming user is not necessary. In still another embodiment, the roaming process employs a registration process that can retrieve and store associated with the user's identifier in database 224 or account database 248 additional trusted computing identifiers as described above used for roaming, and the trusted computing identifiers may be designated by registration manager 222 in such database as being for one time, or limited duration use in the same manner that each persistent file was described as being so designated in such databases as described above. Enforcement of such limitations operates in the same manner as enforcement of the limitations of the persistent files as described above.

Methods

Figures 3A, 3C:
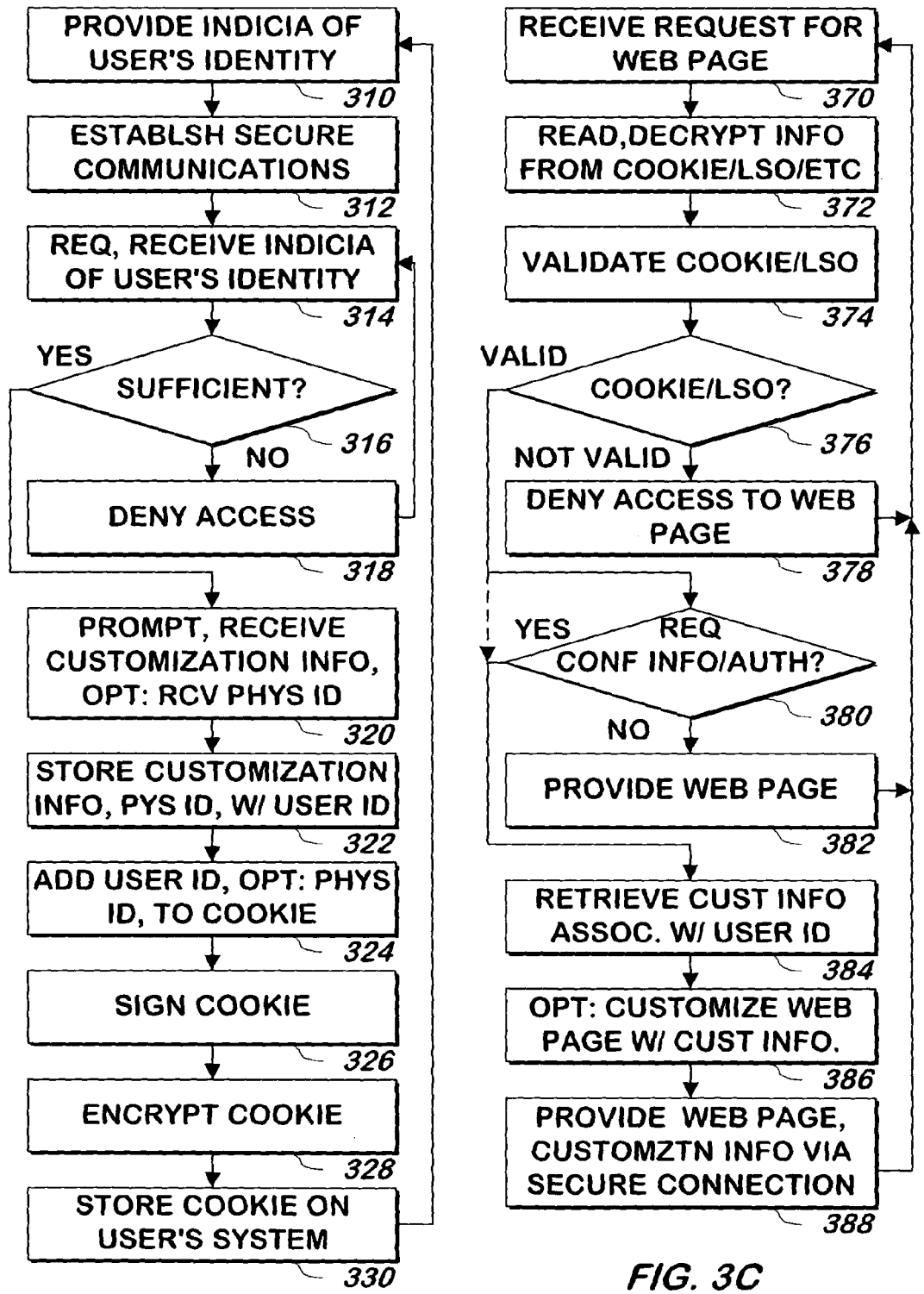
FIG. 3A is a flowchart illustrating a method of registering a user to allow the user to authenticate a communication from a computer system, a computer system to authenticate the user, or both, according to one embodiment of the present invention.
FIG. 3C is a flowchart illustrating a method of allowing a computer system to authenticate a user and/or allowing the user to authenticate communications received from the same or a different computer system according to one embodiment of the present invention.

Referring now to FIG. 3A, a flowchart illustrating a method of registering a user to allow the user to authenticate a communication from a computer system, a computer system to authenticate the user, or both, is shown according to one embodiment of the present invention.

An indicia of a user's identity may be generated and provided 310 as described above. The indicia provided in step 310 may be provided via the Internet or out-of-session (e.g. via e-mail, telephone or a different session) as described above in one embodiment, and in another embodiment, step 310 may be omitted. Secure communications are optionally established 312 with the user. Sufficient indicia of the user's identify are requested and an indicia of the user's identity is received 314. If the indicia is not sufficient 316, access to some or all of the remainder of the steps of FIG. 3A is denied 318 and the method continues at step 314, and otherwise 316, the method continues at step 320.

At step 320, the user is prompted to select or provide customization information as described above and the customization information is received. Step 320 may be performed via a secure communication channel, such as the SSL-encrypted Internet connection established in step 312. In one embodiment, step 320 optionally includes obtaining a physical identifier of the user's computer system, such as a MAC address of an Ethernet card or the source IP address of messages received, if the user has indicated via a response to a prompt that the Internet connection being used is static, such as T1, DSL or cable modem. Customization information may include user-provided content or an indication of one or more pieces of server-supplied content that will be associated with an identifier of the user. Customization information is stored 322 with an identifier of the user, which may be supplied by the user, looked up from the indicia received in step 314 or generated as part of step 322. In one embodiment, step 322 includes storing the physical identifier of the computer system associated with the user identifier.

A persistent file or other similar device that can preserve state on the user's machine from one session to another, such as a Flash local shared object, is built 324 using the user identifier and optionally the physical identifier of the computer system and/or a certificate as described above and the persistent file is signed 326, encrypted 328 and stored on the user's system 330 and the method continues at step 310. Although a cookie may be used as a persistent file, any other similar device, such as a Flash local shared object or other file, may be used as the persistent file.

Figure 3B:
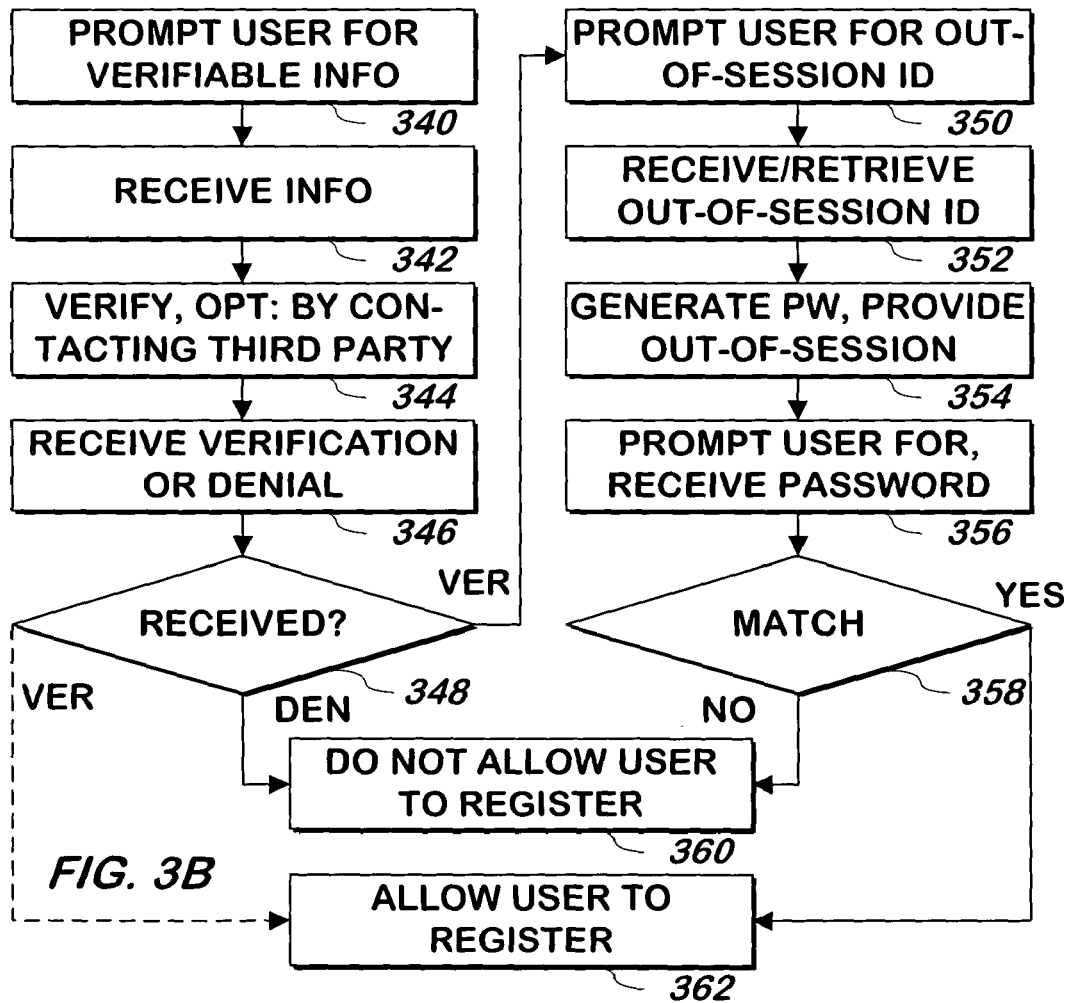
FIG. 3B is a flowchart illustrating a method of providing and receiving indicia of a user's identity according to one embodiment of the present invention.

Referring now to FIG. 3B, a flowchart illustrating a method of providing and receiving indicia of a user's identity is shown according to one embodiment of the present invention. The steps of FIG. 3B may be used in place of some or all of steps 310-318 of FIG. 3A, for example.

A user is prompted 340 to provide information that can be used to verify that the user is who he or she identifies himself or herself to be, such as a user identifier and a drivers license number. Such information, provided by the user, is received 342. An attempt is made to verify 344 the information provided by the user, for example, by looking up the user's name and state of residence using the user identifier and sending the user's name and drivers license number to the motor vehicle department of the user's state of residence to verify that the driver's license number provided matches the name corresponding to the user identifier provided. A verification of the user's information may be generated or received from the same party that performs the verification or from a third party or a denial that the information provided corresponds may be generated or received from that same party or a third party 346. If what is received is a verification that various portions of the information provided by the user corresponds to one another 348, the method continues at step 350 and otherwise 348, the method continues at step 360.

At step 350, the user may be prompted for an out-of-session identifier, such as a phone number, e-mail address or other out-of-session communication identifier and such identifier is received 352, however, in another embodiment, such identifier is prompted and received as part of steps 340-342 and in still another embodiment, no such prompting is used: the out-of-session identifier is retrieved from a record in a database corresponding to the user identifier in step 352. A password is generated and provided 354 using the out-of-session identifier received and the user is prompted to enter the password using the session and the password may be received 356.

If the password generated in step 354 does not match that received in step 356 or no password is received in step 356 within a certain period of time 358, the user is not allowed to register customization information as described herein 360 and otherwise 358, the user is allowed to register customization information as described herein 362. Step 362 may include requiring the user to provide a new password, and such password or the password provided may be stored associated with the user identifier as described above.

It isn't necessary to use the out-of-session communication branch in steps 350-358. In one embodiment, if the user information received in step 342 verifies the user's identity 348, the method continues at step 362, as indicated by the dashed line in the Figure. In still another embodiment, the out-of-session identifier is already known and this can be used to authenticate the user, so the method begins at step 354 in one embodiment, or step 354 follows step 342, and the verifiable information of steps 340 and 342 includes only a user identifier or a user identifier and a password.

Referring now to FIG. 3C, a flowchart illustrating a method of allowing a computer system to authenticate a user and/or allowing the user to authenticate communications received from the same or a different computer system is shown according to one embodiment of the present invention. The steps of FIG. 3C may be performed after some or all of the steps of FIG. 3A.

A request for a web page is received 370 and information from an encrypted persistent file is read 372 from the device from which the request was received and the persistent file is decrypted. The persistent file is validated 374 as described herein. If step 374 indicates that the persistent file is not valid 376, access to the requested web page or the remainder of a web site may be denied 378 and the method continues at step 370, and otherwise 376, the method continues at step 380.

At step 380, if the request is a request for a web page that will not request confidential information or provide information that the user may want to have authenticated, the requested web page may be provided 382 and the method continues at step 370, and otherwise 380, the method continues at step 384. In another embodiment indicated by the dashed line in the Figure, the test of step 380 is not performed and step 384 follows the "valid" branch of step 380 unconditionally.

At step 384, a user identifier stored in the persistent file retrieved in step 372 or entered by a user is used to retrieve customization information associated with that user identifier as described above and the customization information may be optionally incorporated into the requested web page 386 and the web page and customization information are provided, either via a secure connection, if the customization information is provided over the same connection as the web page, or the customization information may be provided out-of-session as described above 388.

Figure 6:
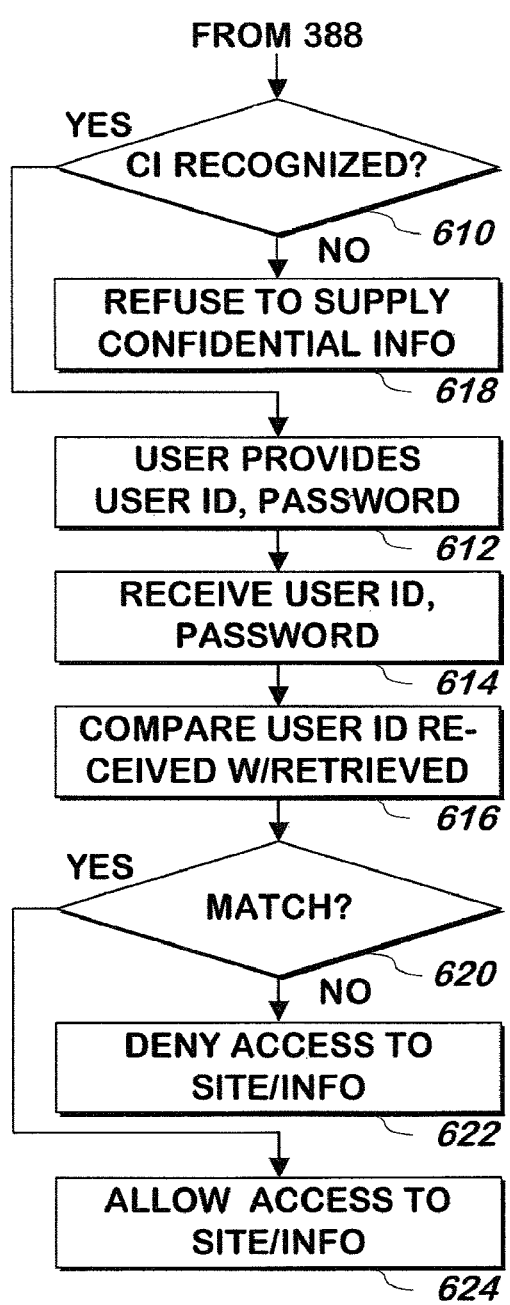
FIG. 6 is a flowchart that continues FIG. 3C according to one embodiment of the present invention.

FIG. 6 is a flowchart illustrating a continuation of the method of FIG. 3C according to one embodiment of the present invention. Referring now to FIG. 6, after step 388, if the user recognizes the customization information 610, the user may provide a user identifier and password 612, for example, using the web page provided in step 386, and the user identifier may be received 614 and compared 616 to the user identifier retrieved in step 372. If the user does not recognize the customization information 610, the user may refuse 618 to provide confidential information such as a user identifier, password, or both.

If the user identifier received from the user in step 612 does not match 620 the user identifier retrieved in step 372, the user is denied further access to some or all of the web site or information related to the user 622 and otherwise 620, the user is granted 624 such access.

In another embodiment, the customization information is not provided until the user has supplied a user identifier or other similar identifier. Referring now to FIG. 5B, a method of authenticating a user to a computer system and authenticating a communication to the user from the same or a different computer system is shown according to one embodiment of the present invention. A request for a web page is received 520 and a web page is provided that contains a prompt for a user identifier 522. The web page provided in step 522 does not contain customization information nor prompt for confidential information and it need not supply information that the user may wish to authenticate other than the URL of its source.

The user identifier and other information from the signed encrypted persistent file are received 524 as described above. The persistent file is decrypted and/or validated as described above and the user identifier compared to the user identifier supplied via the web page 526. If the persistent file is not valid does not match or the user identifiers do not match 528 or both, the user is not provided access to the remainder of the web site 530.

Otherwise 528, customization information is retrieved 532 that is associated with the user identifier, and a web page containing a password request is customized 534 with the customization information retrieved in step 532. The page customized in step 534 is provided 536 to the user, such as via a secure connection, and a user-supplied password is received 538. A correct password is retrieved, for example, from a database using the user identifier, and the user supplied password is compared with the correct password 540. If the user supplied password does not match the correct password, the user is denied access to further portions of the web site 542, and otherwise, access to the web site is granted 544. FIG. 5B employs a password, but in other embodiments, any confidential information may be used in addition to, or in place of, the password and some or all of steps 538-544 need not be performed.

In one embodiment, the persistent file contains a digital certificate and/or an identifier of the computer system, such as a MAC address of a network card, a static IP address used by that computer system or other similar information that may be used to at least indicate, though not with certainty, that a computer system being used by the user is the same one used to register as described above. Step 524 may include receiving that digital certificate and/or identifier from the persistent file and a similar identifier from the computer system and step 526 includes comparing the two identifiers, validating the digital certificate, or both. At step 528, in addition to the conditions specified above, if the two computer system identifiers do not match, or the certificate is not valid access to some or all of the web site is denied, and otherwise, if the other conditions (signature doesn't match or user identifiers do not match) set forth above are not true, the method continues at step 532.

Referring now to FIG. 4, a method of authenticating by a user a communication from a computer system is shown according to one embodiment of the present invention. Sufficient indicia of identity is optionally received (e.g. out-of-session) and provided as described above 410. Customization information is identified, such as providing it, selecting it or receiving it as described above 412. An encrypted, signed persistent file may be received and stored as described above 414.

A request for a web page is provided, and optionally, information from the encrypted, signed persistent file is provided 416. The web page and optionally, certain customization information, is received 418 and the customization information is compared 420 to what was provided or selected in step 412. If the customization information received corresponds 422 to that which was identified in step 412 (e.g. because it matches or is otherwise expected), information may be received and believed or provided 426 and otherwise, the user may refuse to receive or believe the information received or refuse to provide information requested 424.

Figure 7A:
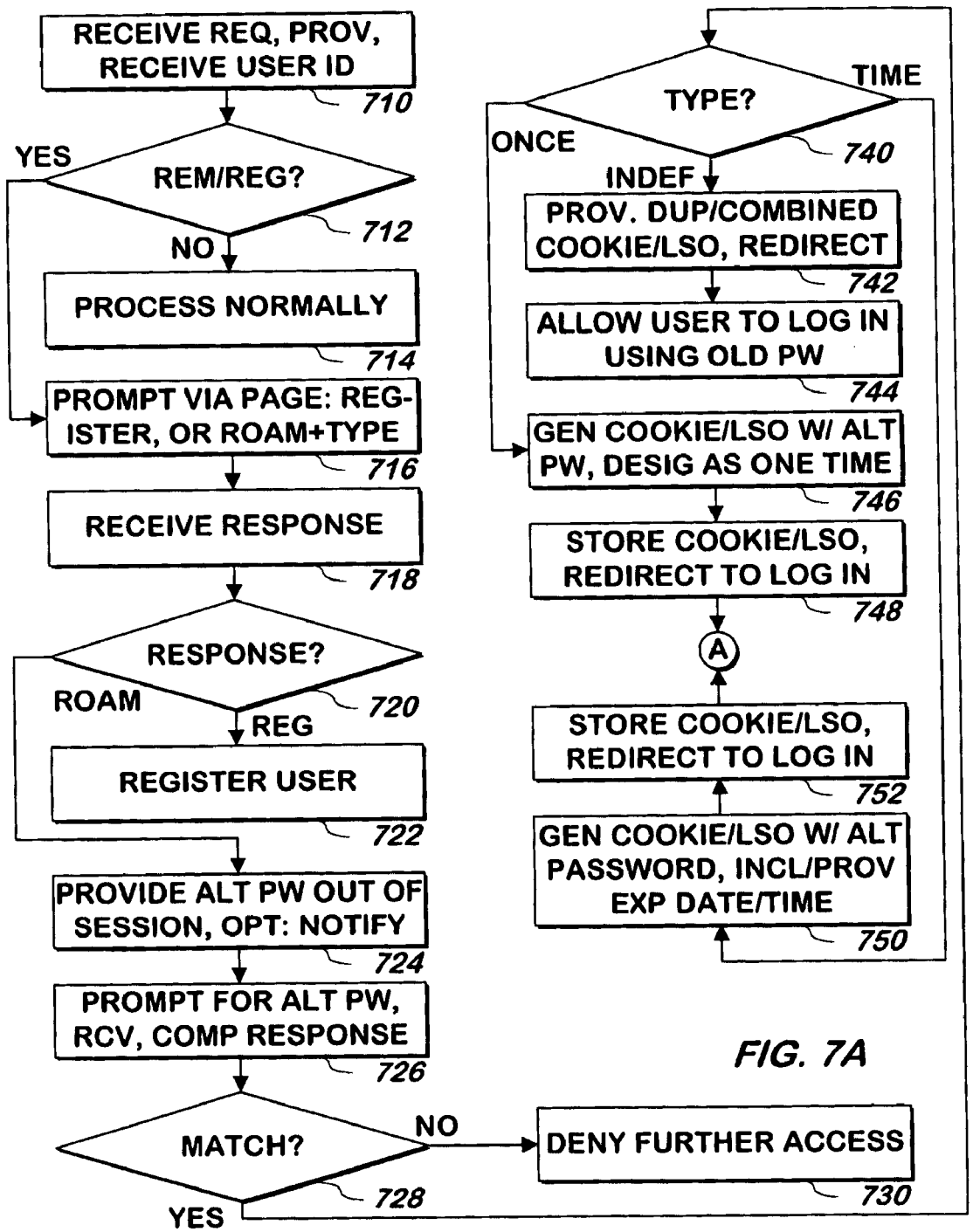
FIG. 7, consisting of FIGS. 7A and 7B, is a flowchart illustrating a method of allowing a roaming user to log in from a computer system other than the computer system from which the user registered according to one embodiment of the present invention.
Figure 7B:
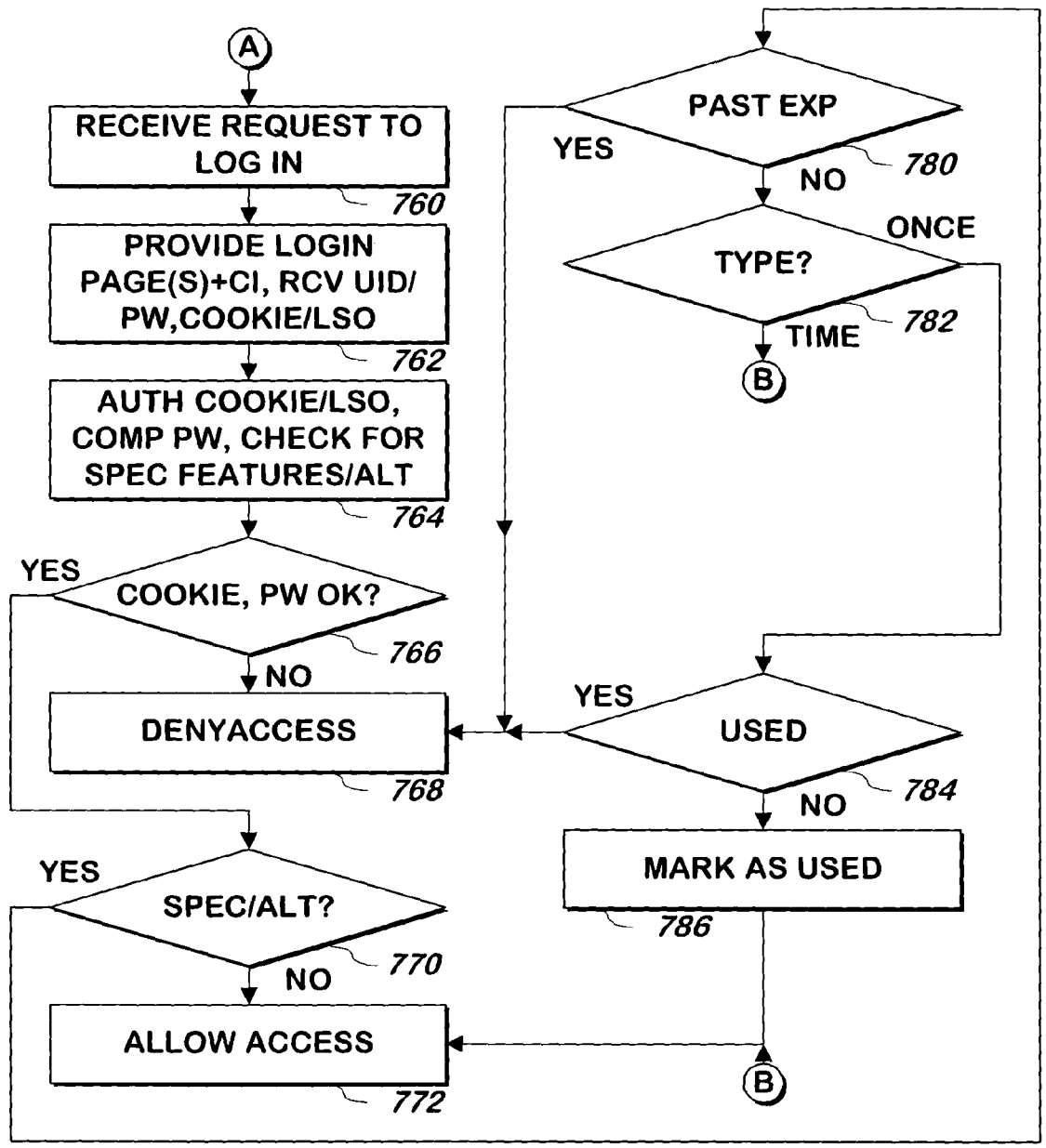

Referring now to FIG. 7, consisting of FIGS. 7A and 7B, a method of allowing a roaming user to log in from a computer system other than the computer system from which the user registered as described above is shown according to one embodiment of the present invention. A request for a log in page is received, and such a page is provided 710. In one embodiment, the log in page contains a text box to allow the user to enter his or her user identifier, and the user may enter his or her user identifier, and check a check box on the web page that indicates a remote (i.e. "roaming") log in or registration, and return the contents of the text box, such as by using conventional CGI techniques. If the remote/registration check box is not selected or a registration or roaming log in is otherwise not indicated 712, the log in process described herein occurs 714. Otherwise 712, a web page is provided with one or more user interface elements that allow the user to indicate that the user wishes to register, or log in from that computer system, a process referred to as roaming, and the type of roaming the user wishes to perform 716. The user enters a response and provides it, for example, using conventional CGI techniques, and the response is received 718.

If the response indicates that the user wishes to register 720, the user registers customization information 722 as described herein. Otherwise 720, an alternate password is generated and provided 724 out-of-session (e.g. via e-mail or telephone), using an out-of-session identifier (e.g. e-mail address or telephone number) that has been prestored, associated with the user identifier received from the user in step 712 or the user may provide sufficient indicia of his or her identity and provide the out-of-session identifier. Step 724 may include providing a web page notifying the user that the alternate password has been provided, and this step may be performed depending on the type of identifier, for example, providing it if the out-of-session identifier is one in which the alternate password is stored, for example, using e-mail, but not if the alternate password would not be stored, for example, if the out-of-session identifier is a telephone number.

A web page is provided requesting the user to enter the alternate password and a response may be received and compared 726 to the alternate password provided in step 724. In one embodiment, this web page may be the same web page as is used to notify the user that the alternate password has been provided as described above. If the response matches the alternate password 728, the method continues at step 740 and otherwise 728, the user is denied 730 access to certain information and actions available via a web site.

At step 740, if the user has specified at step 718 the type of roaming that will allow the computer system from which the user is logging in be used indefinitely to log that user in, a copy of the user's persistent file is copied to the computer system 742 and the user may log in 744 as described above, optionally by being redirected to the log in page.

In one embodiment, if a persistent file for that web site is already on that computer system, it will be read in step 716, and step 742 includes generating a combined persistent file that contains information for the one or more users corresponding to the retrieved persistent file and the roaming user. A different serial number may be assigned to the persistent file for each user described therein for use as described above. The log in process includes checking all the user identifiers stored in the persistent file and allowing the user to log in if the user's user identifier corresponds to any one of the users corresponding to the information in the persistent file. When combining persistent files, those users corresponding to expiration dates and times that are before the current date and time are removed from the persistent file.

At step 740, if the type of roaming indicated in step 718 is a one time use, a persistent file is generated that is designated as a one time use persistent file, such designation being either in the persistent file or in a database 746. In one embodiment, step 746 also includes computing and associating an expiration date and time with the persistent file, either by storing it in the persistent file or storing it associated with the signature of the persistent file and the user identifier in a database as described above. The persistent file generated in step 746 may be a combined persistent file, combing the user's information with that of other users read from an existing persistent file as described above with each user corresponding to the persistent file having a different serial number assigned to, and stored in, the combined persistent file.

The persistent file is stored 748 on the computer system and the user is allowed to log in, for example, by redirecting the user to a log in page, and the method continues at step 760 of FIG. 7B. Step 748 may include assigning a serial number to the user and persistent file and storing the serial number and password provided or a different password to be used with that persistent file, such storage associated with the user identifier.

If the type of roaming indicated in step 718 is limited duration roaming 740, the duration may be specified by the user using a user interface element on the web page provided at step 716 and the duration is received as part of the response in step 718. A persistent file is generated and an expiration date and time is computed for the persistent file by adding the user specified duration to the current time (or by using a user specified expiration in place of the user specified duration) and the expiration date and time is stored associated with the persistent file, either by including it with the persistent file or adding the expiration date and time and the signature of the persistent file into a database associated with the user identifier 750. The persistent file is stored on the computer system, and optionally combined with the information from another persistent file as described above (with each user corresponding to the persistent file having a different serial number assigned to, and stored in, the combined persistent file), and the user is allowed to log in, for example by redirecting the user to a log in page 752. Step 752 may include assigning a serial number to the user and persistent file and storing the serial number and password provided or a different password to be used with that persistent file, such storage associated with the user identifier.

At step 760 (shown in FIG. 7B), the request to log in is received. One or more log in pages may be provided to the user, with the log in page requesting the user's password being provided with the customization information registered for the user as described above, and the persistent file and the user's user identifier and password is received 762. The persistent file is validated as described above, the user identifier supplied by the user may be compared with that stored in the persistent file, the password received is checked against the password stored for the user identifier either the regular password or the one provided in step 724 based on the serial number of the persistent file, and the persistent file is checked to see whether it corresponds to special features, for example whether it is a one time or limited duration persistent file as described above 764.

If the persistent file is valid, the user identifiers match, and the password received matches the user's regular password or the password corresponding to the user identifier and the serial number of the persistent file 766, the method continues at step 770 and otherwise 766, access to certain information is denied 768.

At step 770, if the persistent file does not correspond to the special features of being a one time use or limited duration file, the user is allowed access to information and/or activities of the web site 772. If the persistent file corresponds to the special features 770, if the persistent file is past its expiration date 780, the method continues at step 768. Otherwise 780, if the persistent file is time limited (but not a one time use persistent file) 782 and the method continues at step 772.

If the persistent file is a one time use persistent file 782, if the persistent file has been previously used 784, the method continues at step 768 and otherwise 784, the persistent file may be marked as used 786 and the method continues at step 772.

The method described above assumes that one time use persistent files are also of limited duration. In the case in which they are not, steps 782 and 780 may be performed in the reverse order, with step 780 being performed only for the "time" branch of step 782 and the "no" branch at step 780 being followed by step 772.

Figure 3D:
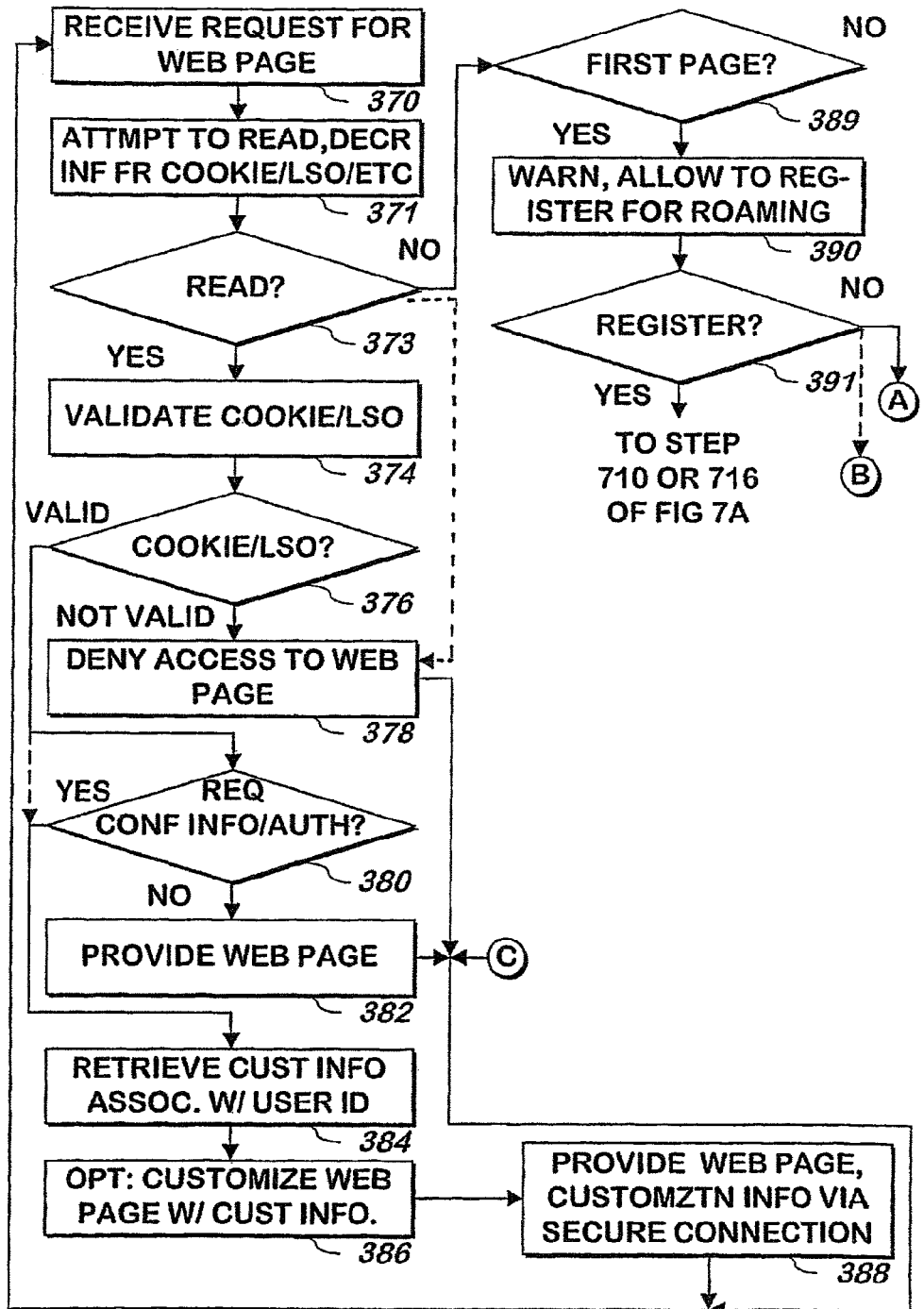
FIGS. 3D and 3E are a flowchart illustrating a method of allowing a user to optionally authenticate one or more communications from a computer system and a computer system to optionally authenticate a user and displaying information according to one embodiment of the present invention.
Figure 3E:
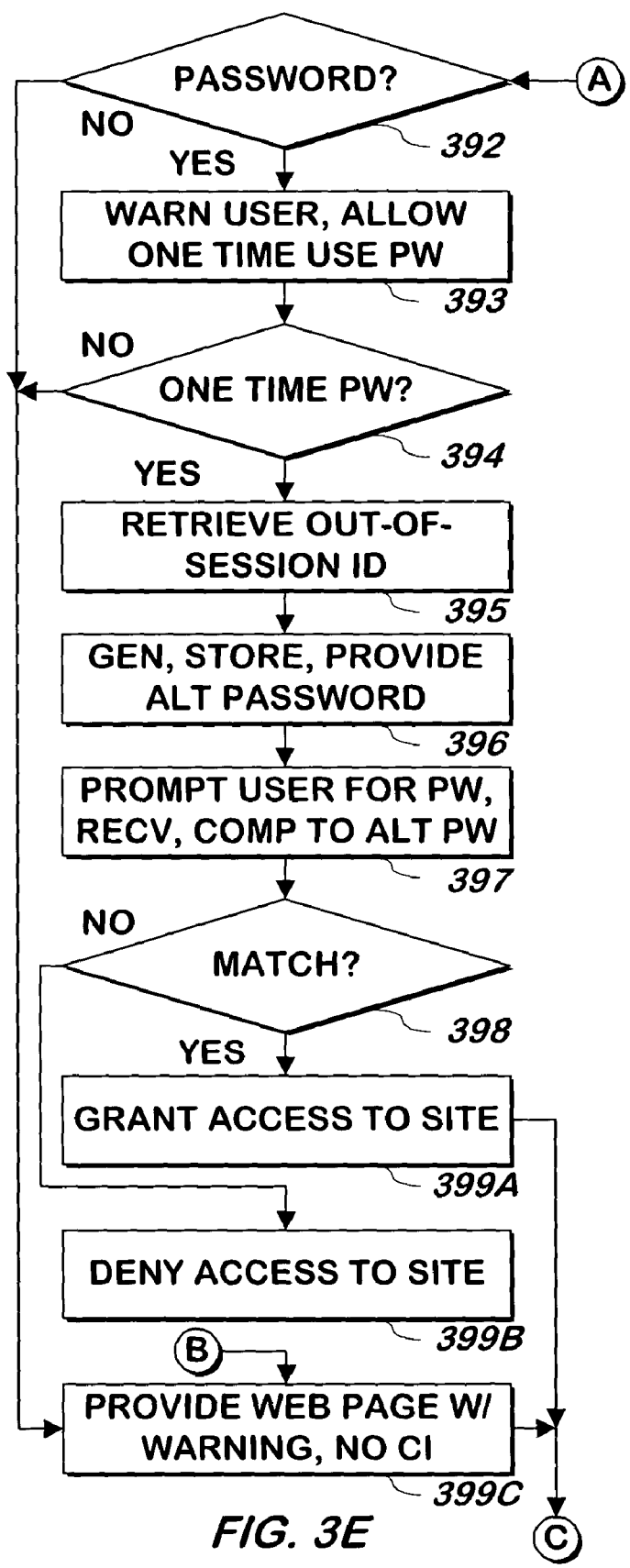

Referring now to FIGS. 3D and 3E a method of allowing a user to optionally authenticate one or more communications from a computer system and a computer system to optionally authenticate a user and displaying information is shown according to one embodiment of the present invention. The steps of FIGS. 3D and 3E are the same as those of FIG. 3C, except as noted below.

Instead of step 372, an attempt is made 371 to read and decrypt information from the persistent file. If the attempt is successful 373, the method continues at step 374, and otherwise 373, the method continues at step 389. In one embodiment, as indicated by the dashed line in the figure, if the persistent file is not valid, the method may continue at step 389 in one embodiment, or step 378 in another.

At step 389, if the page requested is the first page in the session with that user 389, a web page is provided warning the user that the computer system is not registered and that links to the site being requested should not be followed or pasted into a browser, but typed instead, and containing a link to allow the user to register the computer system for roaming as described above 390. If the user clicks the link for registration 391, the method continues at step 710 or 716 of FIG. 7A or another step of FIG. 7A or 7B. If the user does not click the link to register 391, or the page is not the first page in a session with that user 389, the method continues at step 392 of FIG. 3E in one embodiment, or 399C of FIG. 3E in another embodiment.

At step 392 of FIG. 3E, if the web page does not request a password 392, the method continues at step 399C and otherwise 392, a web page is provided 393 warning the user that the computer system may log keystrokes and offering a link to receive a one time use or other alternate password. If the user does not select the link to receive the alternate password 394, the method continues at step 399C. Otherwise 394, an out-of-session identifier such as an e-mail address or a telephone number is retrieved 395 and an alternate password is generated, stored associated with the user identifier and provided via the out-of-session identifier 396. The user is prompted to retrieve the alternate password and enter it, the password is received and compared to the alternate password generated 397. If the password received matches the alternate password 398, the user is granted access to some or all of the web site 399A and the method continues at step 370 and otherwise 398, the user is denied access to some or all of the web site 399B. At step 399C, the requested web page is provided to the user with the warning described above in place of any customization information and the method continues at step 370. In one embodiment, only web pages that would otherwise contain customization information had the user been viewing them on the same computer system used to register the user as described above contain the warning and other pages do not.

Figure 8A:
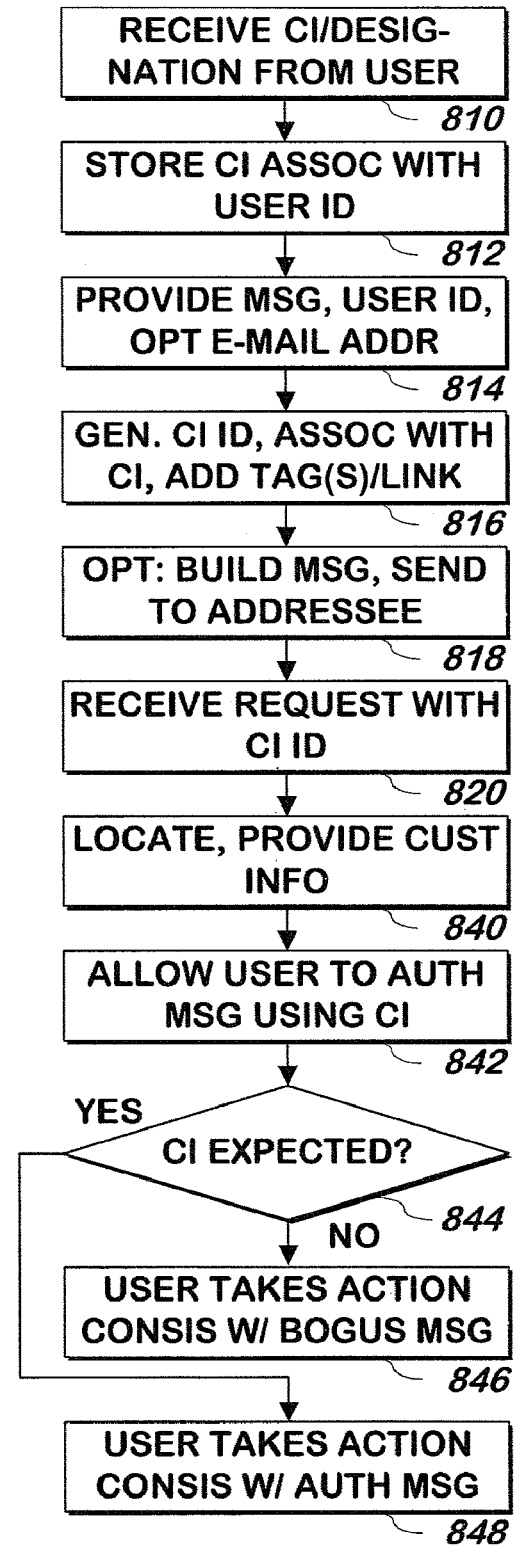
FIG. 8A is a flowchart illustrating a method of allowing a user to authenticate an e-mail message according to one embodiment of the present invention.

Referring now to FIG. 8A, a method of allowing a user to authenticate an e-mail message is shown according to one embodiment of the present invention. The method may be repeated for each of several users.

Customization information is received or designated by a user 810 and the customization information is stored 812 associated with the user identifier for that user as described above. An e-mail message is prepared for the user and the message, and user identifier, and optionally the e-mail address of the user is provided 814. One or more customization information identifiers are generated and built into a link or one or more tags, or code containing one or more links, or any or all of these things, and added to the message as described above, and the customization information identifier is stored associated with the user identifier or the customization information for that user identifier 816. The message is optionally built into an e-mail message (if it was not already built into one) and the e-mail message is sent to the addressee 818. A request is received for the information corresponding to any of the links described above (e.g. a link, a link in a tag, or a link in computer code), either because the user opened the message or clicked on or pasted a link or operated the computer code 820.

The customization information corresponding to the link or links is located and provided in response to the request 840 and the user is allowed to authenticate the message using the customization information 842. If the customization information provided is the customization information expected by the user 844, the user may treat the message as authentic 848. Otherwise or if no customization information is received or the customization information is not what is expected 844, the user may treat the message as not authentic 846.

Figure 8B:
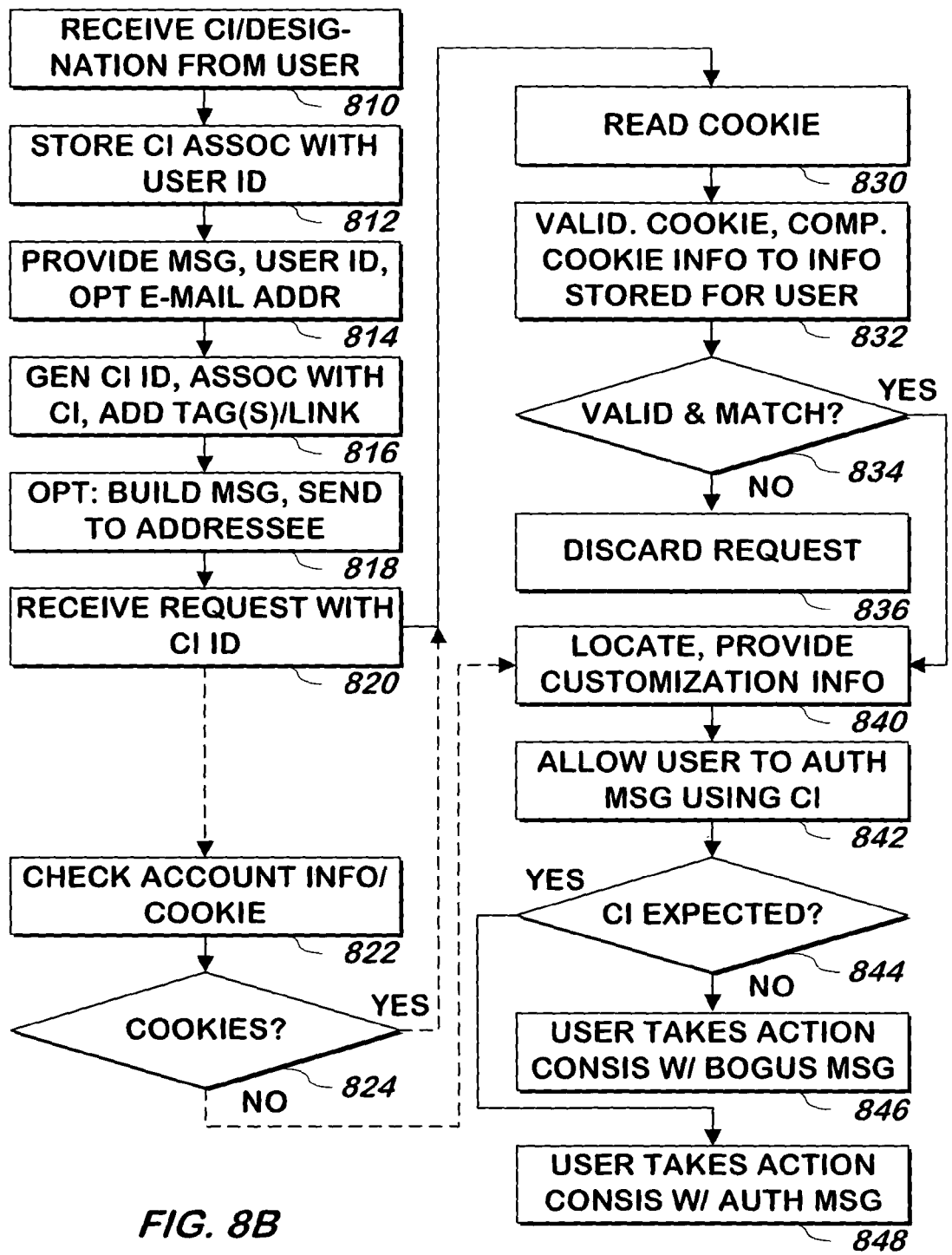
FIG. 8B is a flowchart illustrating a method of allowing a user to authenticate an e-mail message and the same or a different computer system to authenticate the user according to one embodiment of the present invention.

Referring now to FIG. 8B, a method of allowing a user to authenticate an e-mail message and a computer system to authenticate the user is shown according to one embodiment of the present invention. FIG. 8B is the same as FIG. 8A with the exception of elements and flow between steps 820 and 840. In one embodiment, instead of step 840 following step 820, step 830 follows step 820, with steps 830-836 added as follows:

At step 830, information from a persistent file is received. The persistent file is validated as described above and information, such as a user identifier, from the persistent file, is compared 832 with information, such as a user identifier associated with the customization information identifier received with the request in step 820. If the persistent file is valid and the information compared as described above matches 834, the method continues at step 840 and otherwise 834, the request is discarded 836 or an error message may be provided in response.

The cross checking of the information from the persistent file with the stored information may occur in response to certain information stored associated with the user's account identifier, such as whether the user's e-mail client supports persistent files or cookies specifically. As indicated by the dashed lines in the Figure, in one embodiment, instead of step 830 following step 820, step 822 follows step 820.

At step 822, information stored with the user identifier is checked to see if the e-mail client of the user supports persistent files or cookies specifically. If so 824, the method continues at step 830 and if not 824, the method continues at step 840. The information stored with the user identifier may be placed there by the user, a system administrator, or it may have been the result of a prior read or operation of the persistent file, as described above.

Figure 10B:
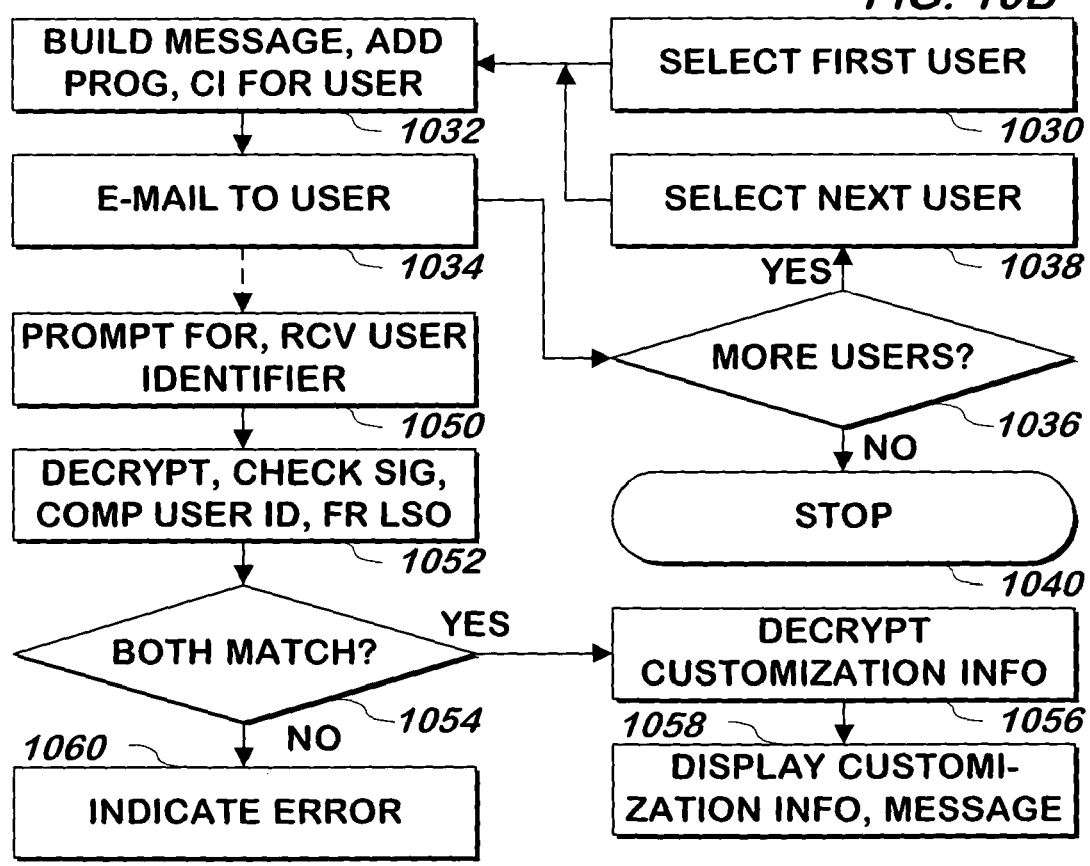
FIG. 10B is a flowchart illustrating a method of providing and displaying an e-mail message is shown according to one embodiment of the present invention.

Referring now to FIG. 10B, a method of providing and displaying an e-mail message is shown according to one embodiment of the present invention. A first user is selected 1030 and an e-mail message is built 1032 for the selected user, including text for the message, which may be personalized for the user, code that implements the steps 1040-1050, such as Flash code or Javascript code, and encrypted customization information. The message is built into an e-mail message and sent 1034 to the e-mail address of the selected user. If there are additional users 1036, another user is selected 1038 and the method continues at step 1032 using the newly selected user, and otherwise 1036, the method terminates 1040.

After the message is sent to a user as described above with reference to step 1034, it may be operated by any such user as described in steps 1050-1060, and indicated by the dashed line between step 1034 and step 1050, for example when the user attempts to open the message.

At step 1050, the user is prompted for a user identifier, and the user supplies the user identifier. A Flash local shared object or other similar file is read and decrypted and a signature is generated using information from the file and compared against a signature stored in the file and the user identifier received from the user is compared with a user identifier in the Flash local shared object 1052. If the signatures match, and the user identifier received in step 1050 matches a user identifier contained in the file 1054, the encrypted customization information is decrypted 1056 and the decrypted customization information and the message text is displayed to allow the user to authenticate the source of the message 1058, and otherwise 1054, an error may be indicated 1060. In another embodiment, the message itself contains the encrypted user identifier and step 1052 consists of decrypting that user identifier (instead of one from a Flash local shared object) and comparing it to the user identifier received from the user.

Secure Transactions

Referring now to FIG. 9A, a method of paying for a transaction over the Internet is shown according to one embodiment of the present invention. A transaction is initiated 910 as described above. A web page requesting the user's user identifier is optionally received 912. One or more web pages are received 914 containing the user's customization information and requesting authorization of the payment as described above by providing confidential information such as a password and/or account number. The customization information is checked 916 against customization information expected. If the customization information is not received or does not match that expected 918, authorization is not provided 920 and otherwise 918, authorization is provided 922, a charge is received against a financial instrument of the user and a confirmation of the transaction is received 924.

As noted above, steps 912 and 914 may be combined so that the user identifier and confidential information may be requested and provided via a single page containing the user's customization information.

Referring now to FIG. 9B, a method of receiving authorization to charge a financial instrument of a user is shown according to one embodiment of the present invention. Transaction information, such as a quantity of goods and/or services for which the charge is to be made, is received, along with an express or implied request to charge a financial instrument 930.

A redirect command is provided 932 and executed that includes information that may be coded in the form of parameters or otherwise, including any or all of: an identifier of the merchant or otherwise indicating an account into which payment is to be received, an identifier of the transaction, and the transaction amount. A signature of one or more of these items may also be provided, or another code may be provided that allows validation of the information in the command. The execution of the redirect command causes a request to be generated as described above, and the request is received 934 containing the coded information. In one embodiment, the request is received by a different commercial entity than the one that sent the command in step 932.

The signature and/or identifier of the merchant or other account that is to receive the payments is validated 936 as described above and if the signature or identifier is not valid, 938, processing of the payment is terminated and a redirect command may be provided to redirect the user back to the original web site 940. The redirect command may indicate the error so that it may be handled by the web site from which the user was originally redirected. If the signature and the merchant or other similar identifier is valid 938, a persistent file is decrypted and validated 942. If the persistent file is valid 944, the user is prompted via a web page for a user identifier, the user identifier is received and compared to that from the persistent file, and/or from among those registered as described above 946 and the method continues at step 948, and otherwise 944, the method continues at step 940.

At step 948, if the user identifier received in step 946 matches the user identifier in the persistent file, a user identifier registered, or both, customization information corresponding to that which will be recognized or otherwise expected by the user is provided on a web page prompting the user for confidential information, such as a password, account number at a financial institution, or both of these, the confidential information is received and compared with confidential information stored for that user 950 and the method continues at step 952, and otherwise 948, the method continues at step 940.

At step 952, if the confidential information received in step 950 matches the confidential information to which it was compared, an authorization identifier may be generated or received, a charge may be made to the user's financial instrument (either one stored for that user or specified by the user), and a redirect command is provided that may include coded information, such as the transaction identifier and authorization identifier 954 and optionally, a signature of these that can be validated. Step 954 may include sending the authorization identifier from one entity to another and that entity receiving the authorization identifier. The result of the redirect may be that a web page or e-mail is made to the user confirming that the transaction has been made 956. If the comparison of step 950 fails 952, the method continues at step 940.

Referring now to FIG. 11A, a method of registering a user is shown according to one embodiment of the present invention. An indicia of a user's identity and a user identifier is received 1110 as described above. Customization information is received and associated with the identifier of the user 1112. An attempt is made 1114 to communicate with a trusted computing facility, such as a biometric subsystem. If a response is received from the trusted computing facility, and optionally, the trusted computing facility itself is validated 1116, if the trusted computing facility indicates that the user is currently authenticated 1118, a trusted computing identifier is received 1122 and the trusted computing identifier is associated with the user identifier 1124. If the user is not authenticated 1118, the user is prompted 1120 to authenticate himself or herself to the trusted computing facility. If there is no response from a trusted computing facility or it cannot be validated 1116, a persistent file is generated and stored 1126 on the user's computer system as described above.

Referring now to FIG. 11B, a method of authenticating a user is shown according to one embodiment of the present invention. An attempt is made 1140 to communicate with a trusted computing facility, such as a biometric subsystem. If a response is received from the trusted computing facility and, optionally, the trusted computing facility is validated 1142, if the trusted computing facility indicates that the user is currently authenticated 1144, a trusted computing identifier is retrieved 1148 and the trusted computing identifier is compared with the identifiers stored 1150. Step 1150 may be performed by scanning all the trusted computing identifiers stored for all users, or all of those stored for a particular user who has identified himself, for example, using a user identifier or via a request containing a parameter or a unique link. If a match occurs 1152, the customization information is provided 1154 and other steps described herein with reference to any of the other Figures that follow the user's authentication by the provider of the customization information, may also be performed 1156. If a match does not occur 1152, other steps, described herein with reference to any of the other figures, may be performed, such as using a persistent file, to authenticate a user 1158.

If at step 1144, the user is not authenticated to the trusted computing subsystem, the user is prompted to authenticate himself or herself 1146 and the method continues at step 1144. If at step 1142, the trusted computing facility does not respond or is not valid, the method continues at step 1158. In one embodiment, indicated by the dashed lien line in the Figure, instead of step 1158 being performed as described above, access to the customization information is denied 1140.

The method of FIG. 11B may be performed as part of the authentication of the user processes described above, either in place of prompting the user to provide a user identifier, password or both, in place of receiving, authenticating and comparing a user identifier stored in a persistent file, or any or all of these.

The ideas described above may be combined in any manner so that certain steps described with reference to one flowchart or a part of a schematic diagram may be performed in conjunction with another flowchart or other portion of a schematic diagram.

The claim terms of any application should be limited only with reference to the file history of that application and any parent applications, but not by the after-allowance file history of any other application that may continue or continue in part such application or parent application.

What is claimed is:

1. A method of receiving information useful for logging a user into a computer system, comprising:
    causing a user identifier to be stored in a persistent file of a client system;
    receiving from the user a request to log into the computer system;
    responsive to the request received;
        receiving the persistent file including the user identifier from the client system;
        providing from the computer system to the user a prompt for the user identifier;
        receiving a response from the user responsive to the prompt for the user identifier; and
        determining if the response received from the user matches the user identifier received in the persistent file; and
    responsive to a determination that the response received matches the user identifier received:
        providing from the computer system to the user a prompt for confidential information; and
        presenting to the user customization information corresponding to the user identifier received that is perceptible to the user and can allow the user to authenticate the computer system if the customization information presented matches customization information expected by the user;
    said customization information being presented to the user before or during the providing from the computer system to the user the prompt for confidential information step;
    said customization information not being presented to the user between the receiving the request step and the determination that the response received matches the user identifier received; and
    the correspondence of the customization information with the user identifier not ordinarily being publicly known.

2. The method of claim 1 wherein the customization information was identified by the user prior to the receiving the request step.

3. The method of claim 2 wherein the customization information was identified by the user providing the customization information to the computer system.

4. The method of claim 1 wherein the customization information for the user may be different from customization information for at least one other user who may log into the computer system.

5. The method of claim 4, wherein the customization information for the user may be different from customization information for all other users who may log into the computer system.

6. The method of claim 1 wherein the presenting to the user customization information step is additionally responsive to at least a portion of the persistent file received from the client system other than the user identifier.

7. The method of claim 1 wherein the presenting to the user customization information step is additionally responsive to at least a portion of an identifier corresponding to the client system.

8. The method of claim 1 wherein the user identifier in the persistent file is encrypted in the persistent file.

9. The method of claim 1 wherein the persistent file comprises a local shared object capable of being used by a Flash movie.

10. A system for receiving information useful for logging a user into a computer system, comprising:
    at least one storage; and
    a processor operatively coupled to the at least one storage, the processor being operative to perform the steps of:
    causing a user identifier to be stored in a persistent file of a client system;
    receiving from the user a request to log into the computer system;
    responsive to the request received;
        receiving the persistent file including the user identifier from the client system;
        providing from the computer system to the user a prompt for the user identifier;
        receiving a response from the user responsive to the prompt for the user identifier, and
        determining if the response received from the user matches the user identifier received in the persistent file; and
    responsive to a determination that the response received matches the user identifier received:
        providing from the computer system to the user a prompt for confidential information; and
        presenting to the user customization information corresponding to the user identifier received that is perceptible to the user and can allow the user to authenticate the computer system if the customization information presented matches customization information expected by the user;
    said customization information being presented to the user before or during the providing from the computer system to the user the prompt for confidential information step;
    said customization information not being presented to the user between the receiving the request step and the determination that the response received matches the user identifier received; and
    the correspondence of the customization information with the user identifier not ordinarily being publicly known.

11. The system of claim 10 wherein the processor is further operative to perform the step of:
    receiving from the user, prior to a time at which the customization information is presented to the user, an identification of the customization information to be presented to the user.

12. The system of claim 11 wherein the customization information is identified by the user providing the customization information.

13. The system of claim 10 wherein the customization information for the user may be different from customization information for at least one other user who may log into the computer system.

14. The system of claim 13, wherein the customization information for the user may be different from customization information for all other users who may log into the computer system.

15. The system of claim 10 wherein the processor is further operative to perform the step of presenting the customization information additionally responsive to at least one portion of a persistent file other than the user identifier.

16. The system of claim 10 wherein the customization information is presented to the user additionally responsive to a portion of an identifier corresponding to the client system.

17. The system of claim 10 wherein the user identifier is encrypted in the persistent file.

18. The system of claim 10 wherein the persistent file comprises a local shared object capable of being used by a Flash movie.

19. A computer program product comprising a computer useable medium having computer readable program code embodied therein for receiving information useful for logging a user into a computer system, the computer program product comprising computer readable program code devices configured to cause a computer system to:

cause a user identifier to be stored in a persistent file of a client system;

receive from the user a request to log into the computer system;

responsive to the request received;

receive the persistent file including the user identifier from the client system;

provide from the computer system to the user a prompt for the user identifier;

receive a response from the user responsive to the prompt for the user identifier; and determine if the response received from the user matches the user identifier received in the persistent file; and responsive to a determination that the response received matches the user identifier received:

provide from the computer system to the user a prompt for confidential information; and present to the user customization information corresponding to the user identifier received that is perceptible to the user and can allow the user to authenticate the computer system if the customization information presented matches customization information expected by the user;

said customization information being presented to the user before or during the providing from the computer system to the user the prompt for confidential information step;

said customization information not being presented to the user between the receiving the request step and the determination that the response received matches the user identifier received; and the correspondence of the customization information with the user identifier not ordinarily being publicly known.

20. The computer program product of claim 19 wherein the customization information was identified by the user prior to the receiving the request step.

21. The computer program product of claim 20 wherein the customization information was identified by the user providing the customization information to the computer system.

22. The computer program product of claim 19 wherein the customization information for the user may be different from customization information for at least one other user who may log into the computer system.

23. The computer program product of claim 22, wherein the customization information for the user may be different from customization information for all other users who may log into the computer system.

24. The computer program product of claim 19 wherein the computer readable program code devices configured to cause the computer system to present to the user customization information are additionally responsive to at least a portion of the persistent file received from the client system other than the user identifier.

25. The computer program product of claim 19 wherein the computer readable program code devices configured to cause the computer system to present to the user customization information are additionally responsive to at least a portion of an identifier corresponding to the client system.

26. The computer program product of claim 19 wherein the user identifier in the persistent file is encrypted in the persistent file.

27. The computer program product of claim 19 wherein the persistent file comprises a local shared object capable of being used by a Flash movie.

* * * * *

UNITED STATES PATENT AND TRADEMARK OFFICE
CERTIFICATE OF CORRECTION

PATENT NO. : 7,730,321 B2  Page 1 of 1
APPLICATION NO. : 11/050549
DATED : June 1, 2010
INVENTOR(S) : Louis A. Gasparini et al.

It is certified that error appears in the above-identified patent and that said Letters Patent is hereby corrected as shown below:

Claim 1, col. 43, line 24 delete ";" after "received" and insert -- : --

Claim 10, col. 44, line 23 delete ";" after "received" and insert -- : --

Claim 19, col. 45, line 28 delete ";" after "received" and insert -- : --

Signed and Sealed this

Seventeenth Day of August, 2010

David J. Kappos
*Director of the United States Patent and Trademark Office*